(12) United States Patent
Brownrigg et al.

(10) Patent No.: US 6,249,516 B1
(45) Date of Patent: Jun. 19, 2001

(54) WIRELESS NETWORK GATEWAY AND METHOD FOR PROVIDING SAME

(76) Inventors: Edwin B. Brownrigg, 328 King Rd., Roseville, CA (US) 95678; Thomas W. Wilson, 139 Avington Rd., Alameda, CA (US) 94502

( * ) Notice: Subject to any disclaimer, the term of this patent is extended or adjusted under 35 U.S.C. 154(b) by 0 days.

(21) Appl. No.: 09/492,930

(22) Filed: Jan. 27, 2000

Related U.S. Application Data

(62) Division of application No. 08/760,895, filed on Dec. 6, 1996, now Pat. No. 6,044,062.

(51) Int. Cl.[7] ................................................. H04L 12/66
(52) U.S. Cl. ........................................ 370/338; 370/401
(58) Field of Search .................................. 370/338, 349, 370/352, 353, 354, 355, 356, 400, 401, 466, 467, 328, 351, 241; 455/11.1

(56) References Cited

U.S. PATENT DOCUMENTS

| | | | |
|---|---|---|---|
| 5,282,204 | * | 1/1994 | Shpancer et al. . |
| 5,592,491 | * | 1/1997 | Dinkins et al. .................... 455/11.1 |
| 5,732,078 | * | 3/1998 | Arango ................................ 370/355 |
| 5,757,783 | * | 5/1998 | Eng et al. ............................ 370/349 |
| 5,790,938 | * | 8/1998 | Talarmo .............................. 455/11.1 |

OTHER PUBLICATIONS

Frankel, Michael S., "Packet Radios Provide Link for Distributed, Survivable C[3] in Post–Attack Scenarios," MSN Jun. 1983.
Lauer, Greg et al., "Communications in the Information Age," IEEE 1984, pp. 15.1.1–15.1.4.
WestCott, Jil A., "Issues in Distributed Routing for Mobile Packet Radio Network," IEEE 1982, pp. 233–238.
Westcott, Jil et al., "A Distributed Routing Design for a Broadcast Environment," IEEE 1982, pp. 10.4–1–10.4–5.
Kahn, Robert E., "Advances in Packet Radio Technology," IEEE Nov. 1978, vol. 66, No., 11, pp. 1468–1496.
Kahn, Robert E., "The Organization of Computer Resources into a Packet Radio Network," IEEE Jan. 1977, vol. Com–25, No. 1, pp. 169–178.
MacGregor, William et al., "Multiple Control Stations in Packet Radio Network," IEEE 1982, pp. 10.3–1–10.3–5.
Shacham, Nachum et al., "Future Directions in Packet Radio Technology," IEEE 1985, pp. 93–98.
Jubin, John, "Current Packet Radio Network Protocols," IEEE 1985, pp. 86–92.
Gower, Neil et al., "Congestion Control Using Pacing in a Packet Radio Network," IEEE 1982, pp. 23.1–1–23.1–6.

* cited by examiner

*Primary Examiner*—Huy D. Vu
(74) *Attorney, Agent, or Firm*—Oppenheimer Wolff & Donnelly LLP

(57) ABSTRACT

A wireless network system includes a server having a server controller and a server radio modem, and a number of clients each including a client controller and a client radio modem. The server controller implements a server process that includes the receipt and the transmission of data packets via the radio modem. The client controllers of each of the clients implements a client process that includes the receipt and transmission of data packets via the client radio modem. The client process of each of the clients initiates, selects, and maintains a radio transmission path to the server that is either a direct path to the server, or is an indirect path or "link" to the server through at least one of the remainder of the clients. A method for providing wireless network communication includes providing a server implementing a server process including receiving data packets via a radio modem, sending data packets via the server radio modem, communicating with the network, and performing housekeeping functions, and further includes providing a number of clients, each implementing a client process sending and receiving data packets via a client radio modem, maintaining a send/receive data buffer, and selecting a radio transmission path to the server. The radio transmission path or "link" is either a direct path to the server, or an indirect path to the server through at least one of the remainder of the clients. The process preferably optimizes the link to minimize the number of "hops" to the server.

19 Claims, 42 Drawing Sheets

36

| 001 | 002 | 003 | 004 | 005 | 006 | 007 | 008 | 009 | 010 |
|-----|-----|-----|-----|-----|-----|-----|-----|-----|-----|
| 011 | 012 | 013 | ●14 | 015 | 016 | 017 | 018 | 019 | 020 |
| 021 | 022 | 023 | 024 | 025 | ●26 | 027 | 028 | 029 | 030 |
| 031 | 032 | 033 | 034 | 035 | 036 | 037 | 038 | 039 | 040 |
| 041 | 042 | 043 | 044 | 045 | 046 | 047 | 048 | 049 | 050 |
| 051 | 052 | 053 | 054 | 055 | 056 | 057 | 058 | 059 | 060 |

Fig. 2a

| 001 | 002 | 003 | 004 | ¥05 | 006 | 007 | 008 | 009 | 010 |
|-----|-----|-----|-----|-----|-----|-----|-----|-----|-----|
| 011 | 012 | 013 | ●14 | 015 | 016 | 017 | 018 | 019 | 020 |
| 021 | 022 | 023 | 024 | 025 | ●26 | 027 | 028 | 029 | 030 |
| 031 | 032 | 033 | 034 | 035 | 036 | 037 | 038 | 039 | 040 |
| 041 | 042 | 043 | 044 | 045 | 046 | 047 | 048 | 049 | 050 |
| 051 | 052 | 053 | 054 | 055 | 056 | 057 | 058 | 059 | 060 |

There is only one Internet server in range of client 5.

5 will issue an "I am alive" packet seeking a route to the Internet.

Internet server 14 will respond and add user client 5 to its routing table as its left son.

The updated routing table of Internet server 14 is: 14(05).

The route from user client 5 to the Internet is: 05>14.

Fig. 2b

| | | | | | | | | | |
|---|---|---|---|---|---|---|---|---|---|
| 001 | 002 | 003 | 004 | ¥05 | ¥06 | 007 | 008 | 009 | 010 |
| 011 | 012 | 013 | ●14 | 015 | 016 | 017 | 018 | 019 | 020 |
| 021 | 022 | 023 | 024 | 025 | ●26 | 027 | 028 | 029 | 030 |
| 031 | 032 | 033 | 034 | 035 | 036 | 037 | 038 | 039 | 040 |
| 041 | 042 | 043 | 044 | 045 | 046 | 047 | 048 | 049 | 050 |
| 051 | 052 | 053 | 054 | 055 | 056 | 057 | 058 | 059 | 060 |

There is only one user client in range of client 6.

6 will issue an "I am alive" packet seeking a client repeater route to the Internet.

5 will respond and add 6 to its routing table as its left son.

The updated routing table of Internet server 14 is:
14(05(06)).

The route from user client 6 to the Internet is: 06>05>14.

| 001 | 002 | 003 | 004 | ¥05 | ¥06 | ¥07 | 008 | 009 | 010 |
| 011 | 012 | 013 | ●14 | 015 | 016 | 017 | 018 | 019 | 020 |
| 021 | 022 | 023 | 024 | 025 | ●26 | 027 | 028 | 029 | 030 |
| 031 | 032 | 033 | 034 | 035 | 036 | 037 | 038 | 039 | 040 |
| 041 | 042 | 043 | 044 | 045 | 046 | 047 | 048 | 049 | 050 |
| 051 | 052 | 053 | 054 | 055 | 056 | 057 | 058 | 059 | 060 |

There is only one user client in range of client 7.

7 will issue an "I am alive" packet seeking a client repeater route to the Internet.

6 will respond and add 7 to its routing table as its left son.

The updated routing table of Internet server 14 is:
14(05(06(07))).

The route from user client 7 to the Internet is: 07>06>05>14.

Fig. 2d

| 001 | 002 | 003 | 004 | ¥05 | ¥06 | ¥07 | 008 | 009 | 010 |
| 011 | 012 | 013 | ●14 | 015 | ¥16 | 017 | 018 | 019 | 020 |
| 021 | 022 | 023 | 024 | 025 | ●26 | 027 | 028 | 029 | 030 |
| 031 | 032 | 033 | 034 | 035 | 036 | 037 | 038 | 039 | 040 |
| 041 | 042 | 043 | 044 | 045 | 046 | 047 | 048 | 049 | 050 |
| 051 | 052 | 053 | 054 | 055 | 056 | 057 | 058 | 059 | 060 |

There is only one Internet server in range of client 16.

16 will issue an "I am alive" packet seeking a route to the Internet.

Internet server 26 will respond and add user client 16 to its routing table as its left son.

The updated routing table of Internet server 26 is: 26(16).

The route from user client 16 to the Internet is: 16>26.

Fig. 2e

Server 14 = 14(05(06))
Server 26 = 26(16(07))

Client 05 = 05(06); >14
Client 06 = 06; >05>14
Client 07 = 07; >16>26
Client 16 = 16(07); >26

In a universe of 6 nodes, of which 2 are servers, the average hop distance from a client to an Internet server is 1.5.

| ¥01 | ¥02 | ¥03 | ¥04 | ¥05 | ¥06 | ¥07 | ¥08 | ¥09 | ¥10 |
| ¥11 | ¥12 | ¥13 | ●14 | ¥15 | ¥16 | ¥17 | ¥18 | ¥19 | ¥20 |
| ¥21 | ¥22 | ¥23 | ¥24 | ¥25 | ●26 | ¥27 | ¥28 | ¥29 | ¥30 |
| ¥31 | ¥32 | ¥33 | ¥34 | ¥35 | ¥36 | ¥37 | ¥38 | ¥39 | ¥40 |
| ¥41 | ¥42 | ¥43 | ¥44 | ¥45 | ¥46 | ¥47 | ¥48 | ¥49 | ¥50 |
| ¥51 | ¥52 | ¥53 | ¥54 | ¥55 | ¥56 | ¥57 | ¥58 | ¥59 | ¥60 |

Fig. 2g

Server 14 =
14(24(34),23(32(41(51),42(52)),33(43)),13(22(31)),05(06),
04,03(02(11),12(01,21)))

Server 26 =
26(37(48(59(60),49(50),58),38(39(40)),28(29(30)),47(57)),
36(46(56)),35(44(53,54),45(55)),27(18(19(20))),25,
17(08(09(10)),07),16,15)

Client 01 = 01; >12>03>14
Client 02 = 02(11); >03>14
Client 03 = 03(02(11),12(01,21)); >14
Client 04 = 04; >14
Client 05 = 05(06); >14
Client 06 = 06; >05>14
Client 07 = 07; >17>26
Client 08 = 08(09(10)); >17>26
Client 09 = 09(10); >08>17>26
Client 10 = 10; >09>08>17>26
Client 11 = 11; >02>03>14
Client 12 = 12(01,21); >03>14
Client 13 = 13(22(31)); >14
Client 15 = 15; >26
Client 16 = 16; >26
Client 17 = 17(08(09(10)),07); >26
Client 18 = 18(19(20)); >27>26
Client 19 = 19(20); >18>27>26
Client 20 = 20; >19>18>27>26
Client 21 = 21; >12>03>14
Client 22 = 22(31); >13>14
Client 23 = 23(32(41(51),42(52)),33(43)); >14
Client 24 = 24(34); >14
Client 25 = 25; >26
Client 27 = 27(18(19(20))); >26
Client 28 = 28(29(30));>37>26
Client 29 = 29(30);>28>37>26
Client 30 = 30;>29>28>37>26
Client 31 = 31;>22>13>14

Fig. 2h'

Client 32 = 32(41(51),42(52)); >23>14
Client 33 = 33(43);>23>14
Client 34 = 34;>24>14
Client 35 = 35(44(53,54),45(55));>26
Client 36 = 36(46(56));>26
Client 37 = 37(48(59(60),49(50),58),38(39(40)),
28(29(30)),47(57));>26
Client 38 = 38(39(40));>37>26
Client 39 = 39(40);>38>37>26
Client 40 = 40;>39>38>37>26
Client 41 = 41(51);>32>23>14
Client 42 = 42(52);>32>23>14
Client 43 = 43;>33>23>14
Client 44 = 44(53,54);>35>26
Client 45 = 45(55);>35>26
Client 46 = 46(56);>36>26
Client 47 = 47(57);>37>26
Client 48 = 48(59(60),49(50),58);>37>26
Client 49 = 49(50);>48>37>26
Client 50 = 50;>49>48>37>26
Client 51 = 51;>41>32>23>14
Client 52 = 52;>42>32>23>14
Client 53 = 53;>44>35>26
Client 54 = 54;>44>35>26
Client 55 = 55;>45>35>26
Client 56 = 56;>46>36>26
Client 57 = 57;>47>37>26
Client 58 = 58;>48>37>26
Client 59 = 59(60);>48>37>26
Client 60 = 60;>59>48>37>26

In a universe of 60 nodes, of which 2 are servers, the average hop distance from a client to an Internet server is 2.36206897.

Fig. 2h"

Traversing user client universe . . ..

User client, 9, has 5 user client neighbors.

User client, 9, will probe each for the shortest route to the Internet.
9's current route to the Internet is: nonexistant.

9 is now probing 10.
User client, 9, has no Internet server.
9's current route to the Internet is: nonexistant.

9 is now probing 20.
User client, 9, has no Internet server.
9's current route to the Internet is: nonexistant.

9 is now probing 19.
User client, 9, has no Internet server.
9's current route to the Internet is: nonexistant.

9 is now probing 18.
User client, 9, has no Internet server.
9's current route to the Internet is: nonexistant.

9 is now probing 8.
User client 8 will add 9 to its routing table as its left son.

The updated routing table of Internet server 14 is:
14(05(06(07(08(09)))),04,03).

The route from user client 9 to the Internet is:
09>08>07>06>05>14.

Fig. 2i

Traversing user client universe . . ..

User client, 29, has 8 user client neighbors.

User client, 29, will probe each for the shortest route to the Internet.
29's current route to the Internet is: nonexistant.

29 is now probing 19.
User client 19 will add 29 to its routing table as its left son.

The updated routing table of Internet server 14 is:
14(24,23,13,05(06(07(08(18(28),09(19(29),10(20))))))),
04,03(12(22,21))).

The route from user client 29 to the Internet is:
29>19>09>08>07>06>05>14.

Fig. 2j

Traversing user client universe . . ..

User client, 7, has 5 user client neighbors.

User client, 7, will probe each for the shortest route to the Internet.
7's current route to the Internet is: 07>06>05>14.

7 is now probing 8.
7's current route to the Internet is: 07>06>05>14.

7 is now probing 18.
7's current route to the Internet is: 07>06>05>14.

7 is now probing 17.
User client, 7, has probed its neighbor, user client, 17, and found a shorter path to the Internet.

The old routing table of Internet server, 14, is:
14(24(34(44(54))),23(33(43(53))),13,05(06(07(08(18(28(38(48(58)))),
09(19(29(39(49(59)))),10(20(30(40(50(60)))))))))),04,03(02,12(01,
22(32(42(52))),21(31(41(51))))))).

The updated routing table of Internet server, 26, is:
26(37(47(57)),36(46(56)),35(45(55)),27,25,17(07(08(18(28(38
(48(58)))),09(19(29(39(49(59)))),10(20(30(40(50(60))))))))),16,15).

The route from user client, 7, to the Internet is: 07>17>26.
7's current route to the Internet is: 07>17>26.

7 is now probing 16.
7's current route to the Internet is: 07>17>26.

7 is now probing 6.
7's final route is 07>17>26.

Fig. 2k

Traversing user client universe . . ..

User client, 8, has 5 user client neighbors.

User client, 8, will probe each for the shortest route to the Internet.
8's current route to the Internet is: 08>07>17>26.

8 is now probing 9.
8's current route to the Internet is: 08>07>17>26.

8 is now probing 19.
8's current route to the Internet is: 08>07>17>26.

8 is now probing 18.
8's current route to the Internet is: 08>07>17>26.

8 is now probing 17.
User client, 8, has probed its neighbor, user client, 17, and found a shorter path to the Internet.

The old routing table of Internet server, 26, is:
26(37(47(57)),36(46(56)),35(45(55)),27,25,17(07(08(18(28(38
(48(58)))),09(19(29(39(49(59)))),10(20(30(40(50(60))))))))),16,15).

The updated routing table of Internet server, 26, is:
26(37(47(57)),36(46(56)),35(45(55)),27,25,17(08(18(28(38
(48(58)))),09(19(29(39(49(59)))),10(20(30(40(50(60))))))),07),16,15).

The route from user client, 8, to the Internet is: 08>17>26.
8's current route to the Internet is: 08>17>26.

8 is now probing 7.
8's final route is 08>17>26.

Fig. 2I

Traversing user client universe . . ..

User client, 18, has 8 user client neighbors.

User client, 18, will probe each for the shortest route to the Internet.
18's current route to the Internet is: 18>08>17>26.

18 is now probing 8.
18's current route to the Internet is: 18>08>17>26.

18 is now probing 9.
18's current route to the Internet is: 18>08>17>26.

18 is now probing 19.
18's current route to the Internet is: 18>08>17>26.

18 is now probing 29.
18's current route to the Internet is: 18>08>17>26.

18 is now probing 28.
18's current route to the Internet is: 18>08>17>26.

18 is now probing 27.
User client, 18, has probed its neighbor, user client, 27, and found a shorter path to the Internet.
The old routing table of Internet server, 26, is:
26(37(47(57)),36(46(56)),35(45(55)),27,25,17(08(18(28(38
(48(58)))),09(19(29(39(49(59)))),10(20(30(40(50(60)))))),07),16,15).

The updated routing table of Internet server, 26, is:
26(37(47(57)),36(46(56)),35(45(55)),27(18(28(38(48(58))))),25,
17(08(09(19(29(39(49(59)))),10(20(30(40(50(60)))))),07),16,15).

The route from user client, 18, to the Internet is: 18>27>26.
18's current route to the Internet is: 18>27>26.

18 is now probing . . ..

18's final route is 18>27>26.

Fig. 2m

User client, 29, has 8 user client neighbors.

User client, 29, will probe each for the shortest route to the Internet.
29's current route to the Internet is: 29>19>18>27>26.

29 is now probing 19.
29's current route to the Internet is: 29>19>18>27>26.

29 is now probing 20.
29's current route to the Internet is: 29>19>18>27>26.

29 is now probing 30.
29's current route to the Internet is: 29>19>18>27>26.

29 is now probing 40.
29's current route to the Internet is: 29>19>18>27>26.

29 is now probing 39.
29's current route to the Internet is: 29>19>18>27>26.

29 is now probing 38.
29's current route to the Internet is: 29>19>18>27>26.

29 is now probing 28.
User client, 29, has probed its neighbor, user client, 28, and found a shorter path to the Internet.
The old routing table of Internet server, 26, is:
26(37(28(38(48(58))),47(57)),36(46(56)),35(45(55)),27(18(19(20(30(40(50(60)))),29(39(49(59)))))),25,17(08(09(10)),07),16,15).

The updated routing table of Internet server, 26, is:
26(37(28(29(39(49(59))),38(48(58))),47(57)),36(46(56)),35(45(55)),27(18(19(20(30(40(50(60))))))),25,17(08(09(10)),07),16,15).

The route from user client, 29, to the Internet is: 29>28>37>26.
29's current route to the Internet is: 29>28>37>26.

29 is now probing 18.
29's final route is 29>28>37>26.

Fig. 2n

Traversing user client universe . . ..

User client, 44, has 8 user client neighbors.

User client, 44, will probe each for the shortest route to the Internet.
44's current route to the Internet is: 44>34>24>14.

44 is now probing 34.
44's current route to the Internet is: 44>34>24>14.

44 is now probing 35.
User client, 44, has probed its neighbor, user client, 35, and found a shorter path to the Internet.
The old routing table of Internet server, 14, is:
14(24(34(44(54))),23(32(41(51),42(52)),33(43(53))),13(22(31)),
05(06),04,03(02,12(01(11),21))).

The updated routing table of Internet server, 14, is:
14(24(34),23(32(41(51),42(52)),33(43(53))),13(22(31)),05(06),04,
03(02,12(01(11),21))).

The updated routing table of Internet server, 26, is:
26(37(38(39(40(50(60)),49(59)),48(58)),28(29(30)),47(57)),36(46
(56)),35(44(54),45(55)),27(18(19(20))),25,17(08(09(10)),07),16,15).

The route from user client, 44, to the Internet is: 44>35>26.
44's current route to the Internet is: 44>28>37>26.

44 is now probing . . .
.
.
.
44's final route is 44>35>26.

Fig. 2o

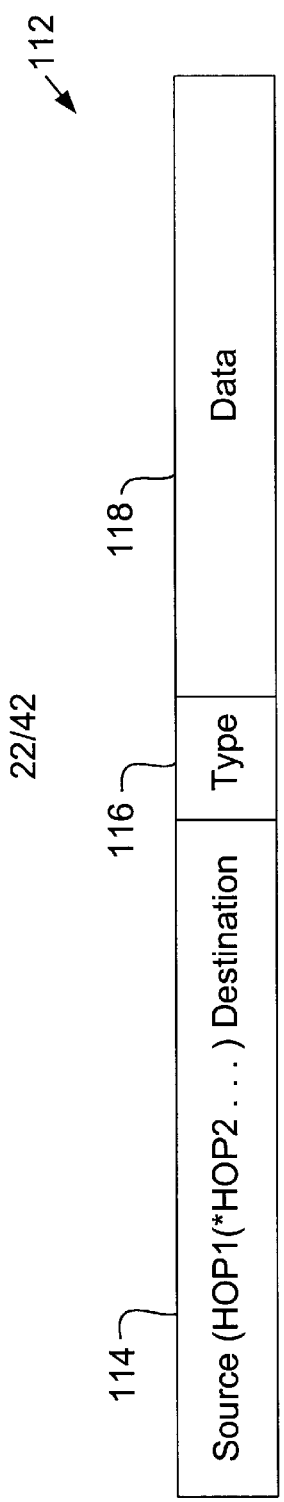
Fig. 5a
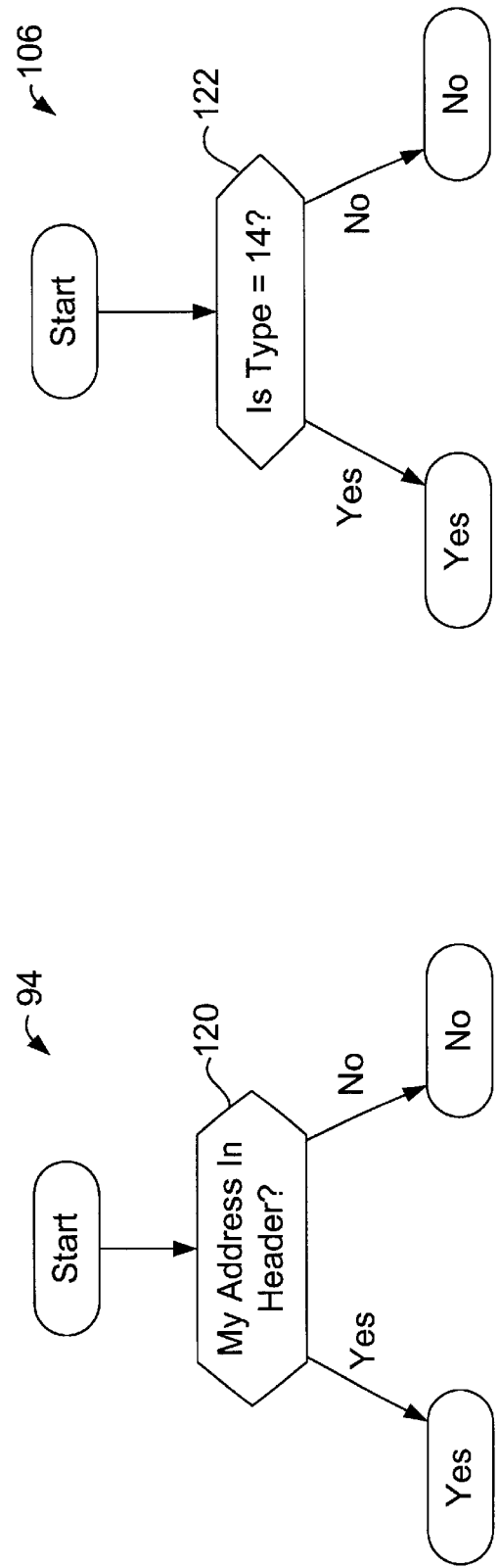
Fig. 5b
Fig. 5c

218

← 220

X(3(9,Z(8,5,Q(P))),B) ← 222

| Element | Node Name | Time Stamp | Memory Location Of Node |
|---|---|---|---|
| 1 | 3 | 1AFG | 12FG3 |
| 2 | P | E013 | 9AA22 |
| 3 | X | 99F6 | . |
| 4 | 5 | B999 | . |
| 5 | 8 | B999 | . |
| 6 | Q | . | . |
| 7 | 9 | . | . |
| 8 | B | . | . |
| 9 | Z | . | . |
| . | . | . | . |
| . | . | . | . |
| . | . | . | . |

224 → Element
226 → Node Name
228 → Time Stamp
230 → Memory Location Of Node

WIRELESS NETWORK GATEWAY AND METHOD FOR PROVIDING SAME

This is a division of U.S. patent application Ser. No. 08/760,895, filed on Dec. 6, 1996 now U.S. Pat. No. 6,044,062. The aforementioned application is incorporated herein by reference.

TECHNICAL FIELD

This invention relates generally to digital computer networks, and more particularly to wireless digital networks for the transmission of digital data packets.

BACKGROUND ART

There are many kinds of networks that can be used to couple computers together for data communication. For example, a simple local area network (LAN), such as a Novell® network or an Appleshare® network, can be used to couple together the personal computers in an office. Often, one or more network "servers" or "hosts" will influence data flow within the network and access to certain network functions such as a central file repository, printer functions, Internet gateways, etc. Other local area networks operate on a peer-to-peer basis without the use of servers.

A wide area network (WAN) is sometimes referred to as a "network of networks." The Internet is a WAN that has, of late, become extremely popular. The origins of the Internet date back several decades to a government-sponsored military/business/research WAN that was designed to remain operational even in the event of a catastrophic loss of a large portion of the network. To accomplish this goal, robust protocols and systems were developed which allowed a geographically distributed collection of computer systems to be connected by means of a network that would remain operational even if large portions of the network were destroyed.

While the use of the Internet has been prevalent for many years now, its use has been limited by the arcane and often difficult commands required to access the various resources of the network. To address this problem, a protocol known as the "World Wide Web" or "WWW" was developed to provide an easier and more user-friendly interface to the Internet. With the World Wide Web, an entity having a domain name creates a "web page" or simply "page" which can provide information and, to an ever greater extent, some interactivity with the web page.

The Internet is based upon a transmission protocol known as "Transmission Control Protocol/Internet Protocol" (or "TCP/IP" for short), which sends packets of data between a host machine, e.g. a server computer on the Internet, and a client machine, e.g. a user's personal computer connected to the Internet. The WWW is an Internet interface protocol which is supported by the same TCP/IP transmission protocol. Intranets are private networks based on Internet standards, and have become quite common for managing information and communication within an organization. Intranets, since they subscribe to Internet standards, can use the same web browser and web server software as used on the Internet. Intranets are, in many cases, supplementing or replacing traditional local area network protocols.

Most, if not all, of the data communication links between the various machines of most networks are hard-wired. That is, client machines are typically coupled to a server and to other client machines by wires (such as twisted-pair wires), coaxial cables, fiber optic cables, and the like. In some instances, some of the communication links can be wireless communication links, such as microwave links, radio frequency (r.f.) links, infrared links, etc., but this tends to be rare with most LANs.

The majority of so-called wireless networks use radio modems for data communication, although there are some IR networks available that work over very short distances, such as within a single large room. However, networks spanning larger areas will predominately use radio modems. GRE America, Inc. of Belmont, Calif. sells a number of spread-spectrum modems that can be used for the transmission of digitally encoded information. A number of wireless network services, such as Ricochet® network services (Ricochet is a subsidiary of Metrocom, Inc. of Los Gatos, Calif.) combine a radio modem with a portable personal computer to allow the personal computer to connect to the Internet. The Ricochet system operates by providing a large number of r.f. data transceivers within a given geographic area, that are often attached to telephone poles, and that are coupled to centralized server that serves as a gateway to the Internet.

The assumption made by the Ricochet system designers is that a given radio modem coupled to portable computer will be in radio contact with one, and only one, transceiver of the network. A data "packet" sent by the portable computer via the radio modem will be received by the transceiver and broadcast through the Ricochet network until it reaches a Wide Area Processor or WAP, where it is transmitted by twisted pair over the Internet to a Ricochet server connected to the Internet. Packets destined for a particular personal computer are received by the server of the Ricochet system, and are transmitted from each of the transceivers with the expectation that the radio modem of the destination portable computer will receive the data packets from one of those transceivers.

It should be noted that wireless communication systems such as the Ricochet system exhibit a number of drawbacks. For one, if the radio modem of the personal computer is not within transmission range of one of the transceivers of the Ricochet network, a connection cannot be made to the network. Furthermore, the Ricochet network can create a great deal of "packet duplication" or "pollution" as copies of a particular data packet are multiply repeated, rather than routed. This packet duplication can also occur if a radio modem of a particular personal computer is in radio transmission range of two or more transceivers of the Ricochet network. In such an instance, the two or more transceivers can each receive the data packets, and each proliferates copies of the data packet across the Ricochet network. While duplicate packets are ultimately discarded, such duplicate packets increase data congestion in the network and increases the work that must be performed by the server. In addition, since data packets are transmitted from all the transceivers of the Ricochet network, there may be packet duplication at the personal computer if it is in contact with more than one transceiver of the Ricochet network, and the bandwidth available from each transceiver is reduced since each transceiver is transceiving each client-destined data packet on the network. Also, since the data is transmitted to the Internet over twisted pair, there is a 28.8K baud bottleneck in the system, resulting is average system performance of even less than 28.8K baud. It is therefore apparent that prior art wireless networks of the Ricochet network type lack robustness (i.e. the ability to maintain communication with the network under adverse conditions) and exhibit a number of inefficiencies such as data packet proliferation.

Cellular telephone systems operate using a number of transceivers, where each transceiver occupies a "cell." As a mobile telephone moves from one cell to another, an elaborate and expensive land-based system causes the mobile telephone to be "handed-off" from the cell that it was previously in to the cell that it is entering. As noted, the equipment and system used for the hand-off is expensive and, further, such hand-off sometimes fail, dropping the telephone connection. Furthermore, individual radios at a given cell can handle only one call at a time, which is inadequate for many computer network systems.

Amateur radio ("Ham") operators have developed a peer-to-peer digital repeater system referred to as the AX.25 protocol. With this protocol, each peer repeats all data packets that it receives, resulting in rapid packet proliferation. In fact, with this protocol, so many packet collisions occur among the peers that the packets may never reach the intended peer.

Lastly, there is abundant reporting in the literature, but it cannot be substantiated, that the U.S. Military has a wireless communication system which allows digital information to be transmitted in a more robust and efficient matter. More specifically, it is suspected that the U.S. Military has a system in which digital data can follow multiple paths to a server that may include one or more clients of the network. However, source code listings, or source code in machine-readable form for these U.S. military systems remains secret and unavailable to the public. Some of the literature pertaining to this U.S. military technology is summarized below.

"Packet Radios Provide Link for Distributed Survivable Command Control Communications in Post-Attack Scenarios", M. Frankel, *Microwave Systems News* 13:6 (June 1983), pp. 80–108, discusses the SURAN (Survivable Radio Network) project and its relation to overall command and control communications ($C^3$) development.

"Congestion Control Using Pacing in a Packet Radio Network", N. Goweer and J. Jubin, *Proceedings of Milcom 82*, (New York: IEEE Press, 1982), pp. 23.1–23.6, describes a technique for pacing flow control used in the DARPA packet radio project.

"Current Packet Radio Network Protocols", J. Jubin, *Proceedings of Infocom 85* (New York: IEEE Press, 1985), pp. 86–92, is a systematic review or the various protocols currently used in the DARPA packet radio network. The article includes a discussion of pacing, route calculation, maintenance of route and connectivity tables, acknowledgment schemes, and other mechanisms. The article also provides a discussion on how the various protocols interrelate and reinforce each other.

"The Organization of Computer Resources into a Packet Radio Network", R. Kahn, *IEEE Transactions on Communications* COM-25:1 (January 1977), pp. 169–178, is a prospectus for the second generation of the DARPA radio project. This lead to the development of the DARPA Bay Area Packet Radio experimental work in the mid to late 1970's.

"Advances in Packet Radio Technology", R. Kahn, S. Gronemeyer, J. Burchfiel, R. Kunzelman, *Proceedings of the IEEE* 66z:11 (November 1978), pp. 1468–1496 is a survey of packet radio technology in the second generation of the DARPA packet radio project.

"Survivable Protocols for Large Scale Packet Radio Networks", G. Lauer, J. Westcott, J. Jubin, J. Tornow, *IEEE Global Telecommunications Conference*, 1984, held in Atlanta, Ga., November 1984 (New York: IEEE Press, 1984) p. 468–471, describes the SURAN network, with an emphasis on network organizations and management protocols.

"Multiple Control Stations in Packet Radio Networks", W. MacGregor, J. Westcott, M. Beeler, *Proceedings of Milcom 82* (New York: IEEE Press, 1982) pp. 10.3–10.3-5, is a transitional paper that describes design considerations involved in converting the DARPA packet radio network from single to multistation operation while eliminating the additional step to a fully hierarchical design. It focuses on the self-organizing techniques that are necessary in the multistation environment.

"Future Directions in Packet Radio Technology", N. Shacham, J. Turnow, *Proceedings of IEEE Infocom 85* (New York: IEEE Press, 1985), pp. 93–98, discusses new research areas in packet radio, with some references to SURAN developments.

"Issues in Distributed Routing for Mobile Packet Radio Networks", J. Westcott, *IEEE Global Telecommunications Conference*, 1982 (New York: IEEE Press, 1982), pp 233–238, studies the issues involved in the DARPA packet radio network, prior to the availability of signal strength sensing from the radio receivers as a hardware capability on which to build. The paper describes issues that must be considered in evaluating the usability of an RF link and gives details of the alternate route mechanism used in the DARPA system to smooth temporary RF propagation problems that appear in a mobile node environment.

"A Distributed Routing Design for a Broadcast Environment", J. Westcott, J. Jubin, *Proceedings of Milcom 82* (New York: IEEE Press, 1982), pp. 10.4-1–10.4-5, is a detailed study of the problems involved in connectivity and routing table management in stationless packet radio, including a discussion of algorithms proposed for the DARPA packet radio network.

There is, therefore, a great deal of literature describing packet radio systems. The prior art does not disclose, however, a packet-based wireless computer network that is both robust and efficient, wherein each client of the network can be efficiently and effectively in communication with a multiplicity of other clients and servers of the network, greatly multiplying the number of link choices available and, if conditions change, or if a better link to a server becomes known to a client, where the link for a client can be updated and improved.

DISCLOSURE OF THE INVENTION

The present invention includes a wireless network system which is particularly well adapted for connection to a wide area network such as an Intranet or the Internet. The wireless network system includes one or more servers which are coupled to the wide area network, and two or more clients capable of communicating with the server or with each other via radio modems. The communication in the wireless network system preferably takes the form of digital data packets, which are not too dissimilar from the TCP/IP data packets used over the Internet. However, the data packets of the present invention also include data routing information concerning the path or "link" from the source of the packet to the destination of the packet within the wireless network. The data packets also include a code indicating the type of packet being sent.

In operation, a client of the wireless network system of the present invention has either a direct or an indirect path to a server of the wireless network system. When in direct communication with the server, the client is said to be "1 hop" from the server. If the client cannot reliably communicate directly with the server, the client will communicate with a "neighbor" client which has its own path ("link") to the server. Therefore, a client can communicate with the server along a link that includes one or more other clients. If a client communicates with the server through one other client, it is said to be "2 hops" from the server, if the client communicates to the server through a series of two other clients, it is said to be "3 hops" from the server, etc. The process of the present invention preferably includes an optimization process which minimizes the number of hops from the clients to the servers, on the theory that the fewer the number of hops, the better the performance of the network. Alternatively, the optimization process can also factor in traffic and transmission reliability of the various links to determine the optimal path to the server.

A wireless network system in accordance with the present invention includes at least one server having a server controller and a server radio modem, and a plurality of clients, each including a client controller and a client radio modem. The server controller implements a server process that includes the controlling the server radio modem for the receipt and transmission of data packets from clients of the network. The client controller implements a client process including the transmission and receipt of data packets from the server and from other clients. Preferably, the client process of each of the clients initiates, selects, and maintains a radio transmission path ("link") to the server. As noted previously, this radio transmission path to the server is either a direct path to the server (1 hop) or an indirect path to the server (multi-hop) through one or more other clients. Preferably, the client process of a particular client also constantly searches for improved paths to the server.

A method for providing wireless network communication in accordance with the present invention includes providing a server implementing a server process, and providing a plurality of clients, each client implementing a client process. The server process includes receiving data packets via a server radio modem, sending data packets via the server radio modem, performing a "gateway" function to another network, and performing housekeeping functions. The client process includes the sending and receiving of data packets via a client radio modem, maintaining a send/receive data buffer in digital memory, and selecting links to the server. Again, the client process preferably chooses a "best" link to the server that is either a direct path or an indirect path through one or more other clients.

The server of the present invention provides a gateway between two networks, where at least one of the networks is a wireless network. The gateway function of the server makes any necessary translations in digital packets being sent from one network to the other network. The server includes a radio modem capable of communicating with a first, wireless network of the present invention, a network interface capable of communicating with the second network (which may or may not be wireless and, in fact, is preferably a wired TCP/IP protocol network), and a digital controller coupled to the radio modem and to the network interface. The digital controller passes data packets received from the first network that are destined for the second network to the second network, and passes data packets received from the second network that are destined for the first network to the first network, after performing any necessary translations to the data packets. The digital controller further maintains a map of the links of the first network and provides that map to first network clients on request. By maintaining a map of the first network links, the server is able to properly address packets received from either the first network or the second network to the appropriate client of the first network, and allows the client of the network to maintain and upgrade their data communication paths to the server.

A network client for a wireless communication network of the present invention includes a radio modem capable of communicating with at least one server and at least one additional client, and a digital controller coupled to the radio modem to control the sending and receiving of data packets. The digital controller is further operative to determine an optimal path to at least one server of the wireless network. The optimal path can be either a direct path to the server, or an indirect path to the server through at least one additional client.

The method, apparatus, and systems of the present invention therefore provide a wireless network that is both robust and efficient. Since each client of the network can potentially be in communication with a multiplicity of other clients and servers of the network, there are a great number of link choices available. If conditions change, or if a better link becomes known to a client, the link can be updated and improved.

These and other advantages of the present invention will become apparent upon reading the following detailed descriptions and studying the various figures of the drawings.

BRIEF DESCRIPTION OF THE DRAWINGS

FIGS. 2a–2g, 2h'–2h", and 2i–2o are used to describe a prototype of the wireless network system of FIG. 1, illustrating both the path connection and path optimization processes of the present invention;

FIG. 5a illustrates a data packet processed by the process illustrated in FIG. 5;

FIG. 5b is a flow diagram illustrating the process "Am I on Route?" of FIG. 5;

FIG. 5c is a flow diagram illustrating the process "Data?" of FIG. 5;

FIGS. 21a–21d illustrate the process of FIG. 20.

BEST MODES FOR CARRYING OUT THE INVENTION

Figure 1:
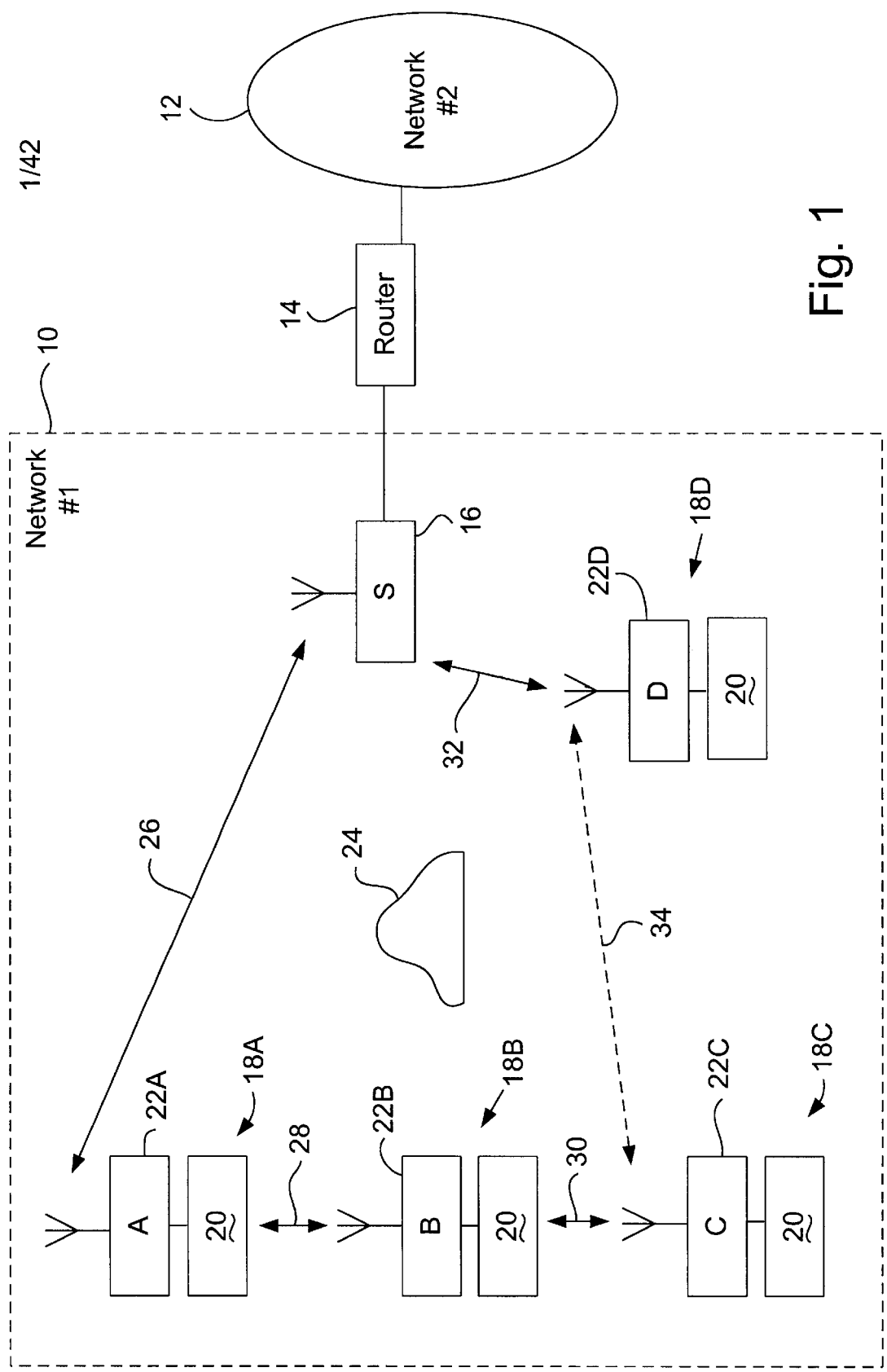
FIG. 1 is a pictorial representation of a wireless network system in accordance with the present invention.

FIG. 1 illustrates a wireless network system 10 in accordance with the present invention. The wireless network system 10, which will also be referred to herein as a "first network," is preferably in communication with a second network 12 via a digital communication bridge or router 14. The construction and operation of networks, such as second network 12, and bridges or routers, such as router 14, are well-known to those skilled in the art. It the present invention, it is preferred that the second network operates on the aforementioned TCP/IP protocols, i.e. the second network is the Internet or is a private Intranet. At times, herein, the second network will be referred to as simply the Internet, it being understood that other forms of a second network are also operable with the systems, apparatus, and processes of the present invention. Again, the construction and operation of the Internet and Intranets are well-known to those skilled in the art. Likewise, routers, bridges, and other network devices such as hubs, gateways and Ethernet interfaces are well-known to those skilled in the art, and are available from a variety of sources including Cisco Systems, 3-Com, Farillon, Asante, etc. In general, as a "network interface" will refer to any such device that allows a server of the wireless network system of the present invention to communicate, directly or indirectly, with the second network.

The wireless network system 10 of the present invention includes one or more servers 16, the single example of which is herein labeled S. It should be noted that the server 16 serves as a gateway in that it performs a translation service between the first network and the second network. For example, the data packets on the first network include links and data types that are only applicable to the first network. Therefore, such links and data types are removed from the data packets before they are transmitted to the second network which, as noted previously, preferably operates on a TCP/IP protocol. Conversely, data packets received from the second network are modified to include the links and data types before they are transmitted to the first network. Therefore, the data packets on the first or wireless network can be essentially "packages" or "envelopes" for TCP/IP data packets when they are destined for the Internet or received from the Internet. However, as will be discussed in greater detail subsequently, the data packets of the first network can be of types other than "data" types for TCP/IP formatted data. It should also be noted that while only a single server S is shown in this example that, in most cases, multiple servers, each with their own gateway to the Internet, will be used in the first network.

The wireless network system 10 further includes a number of clients 18, each including a client machine 20 and a radio modem 22. The client machine 20 can be any form of digital processor, including a personal computer (PC), a computer workstation, a personal digital assistant (PDA), etc. In the present invention, the client machine 20 is preferably a personal computer (PC) made to the Microsoft Windows/Intel microprocessor ("Wintel") standard, or to the Apple Macintosh standard. Wintel and Macintosh compatible computers are commercially available from a variety of vendors. Likewise, computer workstations and PDAs are available from a number of vendors. Radio modems, such as the radio modem 22, are further available from a number of vendors. The present invention has been implemented using radio modems produced by GRE America, Inc. which operate on a spread spectrum technology, and which provide good receiver sensitivity and repeater capabilities. These GRE America, Inc. radio modems are commercially available under the Gína trademark and operate in the 2.4 gigahertz or 90 megahertz bands with support for packetized data transmission. The Gína brand radio modems further include error detection and correction, can operate in asynchronous or synchronous modes, and can support data speed from 300 to 64 kbps. Furthermore, the Gína radio modems can operate in a point-to-point or a point-to-multipoint mode.

A server process, to be discussed in greater detail subsequently, is implemented on the server 16, and a client process, also to be discussed in detail subsequently, operates on each of the clients 18. In the present invention, the client process operates, at least in part, on the client machine 20. However, in alternative embodiment of the present invention, the client process can operate on the controller of the radio modem 22 of the client 18.

In wireless network system 10 illustrated in FIG. 1, the client 18A is in "direct" radio communication with the server 16 as indicated by the radio communication link 26. This will be referred to herein as "direct" or "1 hop" or "line-of-sight" connection with the server 16. The client 18B, however, does not have a direct path or "link" to the server 16 due to an obstacle 24, such as a hill, large building, etc. Therefore, the client 18B communicates via a radio link 28 with client 22A which relays the data packets from client 18B to the server 16. A client 18C has a direct line-of-sight to the server 16, but is out of transmission range to the server 16. Therefore, the client 18C transmits its data packet by a radio link 30 to client 18B, from where it is relayed to client 18A via link 28, for eventual relay to the server S via radio link 26.

As noted in FIG. 1, 18D is in direct communication with server 16 via radio communication link 32. If client 18C detects the transmissions of client 18D, it will note that client 18D has less "hops" to the server 16 than does client 18B, and will switch its link from client 18B to client 18D. This process is a part of the "stabilization" or "optimization" process of the network 10.

It will therefore be appreciated that the wireless network system 10 of the present invention is constantly attempting to optimize itself for the "best" data transmission. In the embodiment described herein, this optimization looks solely to the number of hops between the client and the server for the sake of simplicity. However, other factors can also affect the quality of the data transmission. For example, the traffic of data packets through a particular client modem may be large, such that it is better to route the data from neighboring clients through other clients, even though there may be more hops involved with this alternative routing. Also, some radio links may be less robust or may be slower than other links, such that optimization may result in a routing of data around the less robust or slower links, even though it may increase the number of hops to the server 16. Therefore, although the present preferred embodiment looks at only one single factor in its optimization processes, it will be appreciated by those skilled in the art that multiple factors can be used to stabilize or optimize the wireless network system 10 of the present invention.

It should also be noted that the wireless network system 10 of the present invention is quite robust in that it will survive the loss of one or more clients of the system. For example, if the client 18A is lost due, for example, to a power or system failure, the data packets for client 18C can be routed through the client 18D, and the data packets for the client 18B can be routed through clients 18C. Therefore, the wireless network system 10 is highly robust and highly survivable under a number of adverse conditions.

In addition, the present invention permits mobile communication within the wireless network system 10. For example, if the client 18D is a portable computer and is moved around within the wireless network system 10, it will opportunistically change its data communication path as better links become available. For example, if the client 18D is moved close to the client 18B, it may use the client 18B as its link to the server 16. Also, any routing through the client 18D from other clients (such as 18C in this example) will be updated and optimized as the data path for the client 18D changes.

It should be noted that, in general, the network will work the best and will be the most stable if the radio modems and their client/controllers are never turned off. It is therefore desirable to not have an on/off switch on the radio modem, so that clients are always participating in the network traffic distribution. However, even if a radio modem is turned off, the remaining clients will re-route through other clients, as will be discussed subsequently.

Figures 1A, 1B:
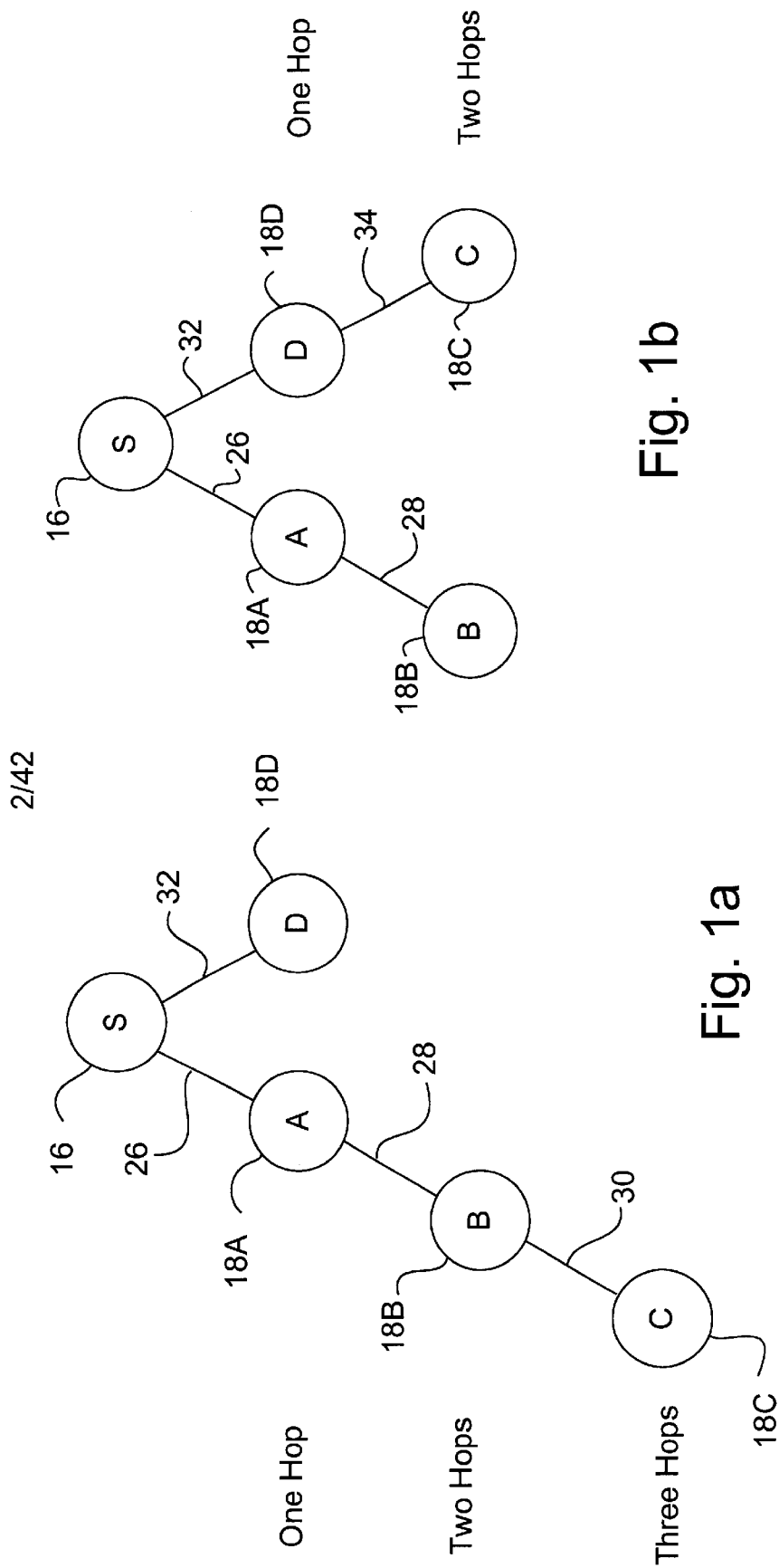
FIG. 1a illustrates a first tree structure of the data communication paths or "links" of the wireless network system of FIG. 1.
FIG. 1b illustrates a second tree structure illustrating optimized or "stabilized" data communication paths for the wireless network system of FIG. 1.

In FIGS. 1a and 1B, two "tree" structures are shown illustrating the various links that were discussed, by way of example, with reference to FIG. 1. The tree structure is maintained in the server S, and is transmitted to any client that may request it.

In FIG. 1a, a tree indicates that client 18A is linked to server 16 by a link 26, client 18B is linked by link 28 to client 18A and by link 26 to the server, and client 18C is linked by line 30 to client 18B, by link 28 to client 18A, and by line 26 to the server 16. The client 18D is in direct communication with the server 16 via radio link 32. Therefore, clients 18A and 18D are both "1 hop" away from the server 16, client 18B is "2 hops" away from server 16, and client 18C is "3 hops" away from server 16.

In the scenario where client 18C realizes it has a better connection to server 16 through the client 18D, the link 30 to client 18B is no longer used, and a new radio link 34 to client 18D is established. This is illustrated in FIG. 1b. Now, clients 18A and 18B remain 1 hop clients, clients 18B remains a 2 hop client, but client 18C is upgraded from a 3 hop client to a 2 hop client. Therefore, the data transmission efficiency of the network has been "stabilized" or "optimized."

It should be noted that the term "link" is used to convey both the connection to an adjacent client as well as the entire path from a client to a server. It will therefore be understood that when speaking of a link to an adjacent client, that this also implicitly includes all necessary links from that adjacent client to the server, i.e. a link is the entire path description from a given client to a given server.

FIGS. 2a–2o, an exemplary wireless point-to-multipoint network in accordance with the present invention is prototyped to facilitate a discussion of the theory and operation of the present invention. In FIG. 2a, a network 36 with 60 potential "nodes" is illustrated. As used herein, a "node" can either be a client or a server. The nodes 14 and 26 have been arbitrarily selected as servers for the purpose of this example. The nodes 14 and 26 are marked servers with the large, black dot immediately adjacent to those numerals. For the purpose of this example, it is assumed that a node can only communicate with an immediately adjacent node. Of course, in actual operation, nodes may be able to communicate with more distant nodes than its immediate neighbor nodes.

In FIG. 2b, a first client is designated at node 05 (hereafter "client 5"). For the purposes of this example, the Yen or ¥ symbol is positioned next to the client 5. As noted previously, for the purpose of this example, we will assume that any particular node is only in radio communication range of a node that is adjacent in a horizontal, vertical, or diagonal direction, i.e. is an immediately adjacent "neighbor." In this instance, client 5 detects that there is a radio contact with node 14, which is a server (hereafter "server 14"). The server 14 and the client 5 will build a routing path or "link" between each other. This is accomplished by client 5 transmitting a "I Am Alive" packet seeking a route to a server. The server 14, being within radio transmission range, will respond and will add the client 5 to its routing table as its "left son." The meanings of the "routing table" and the "left son" will be described subsequently. The routing table of the server 14 is therefore 14(05), and the route from the client 5 to the server 14 is 05>14. Again, this notation will be discussed in greater detail subsequently.

The network 36 then has a second client 6 added as indicated by the ¥ symbol next to node 6 in FIG. 2c. Second client 6 makes radio contact with client 5 and builds a routing path or "link" to the server 14 through the client 5. Server 14 updates its routing table accordingly. This is accomplished by client 6 issuing an "I Am Alive" packet seeking a client repeater route to a server. Client 5 will respond and add client 6 to its routing table as its left son. The updated routing table of the server 14 is therefore: 14(05(06)). The route from the user client node 6 to the server 14 is: 06>05>14.

In FIG. 2d, a third client 7 is added to the network 36 as indicated by the "¥" symbol next to node 07. Client 7 establishes contact with client 6 and finds a path through clients 6 and 5 to server 14. This is accomplished by client 7 issuing a "I Am Alive" packet seeking a client repeater route to the server 14. Client 6 will respond and add client 7 to its routing table as its left son. The updated routing table of the server 14 is then: 14(05(06(07))). The route from client 7 to the server 14 is: 07>06>05>14.

In FIG. 2*e*, another client 16 has been added at node 16 as indicated by the "Y" symbol. It should be noted that client 16 can make radio contact with clients 05, 06, and 07. However, client 16 recognizes node 26 as being a server (hereafter "server 26") and then connects directly to server 26. This is accomplished by client 16 transmitting a "I Am Alive" packet seeking a route to a server. The server 26 will respond and will add client 16 to its routing table as its left son. The updated routing table of server 26 is then: 26(16). The routing from client 16 to the server 26 is 16>26.

In FIG. 2*f*, a server routing table and a route for each client thus far in the example are illustrated. It should be noted that when client 16 came into existence, a shorter route was created for client 7 to a server, namely via client 16 to server 26. As noted in this figure, client 7 has made the adjustment to connect to server 26, thereby "stabilizing" or "optimizing" the network 26. Also, it should be noted that server 14 has deleted client 7 from its routing table, since client 7 is now using server 26 as its gateway to the Internet. This creates a universe of six nodes, of which two are servers and of which four are clients. The average "hop" distance from a client to a server is 1.5 hops. The remainder FIGS. 2*g*–2*o* further illustrate these concepts.

In FIG. 2*g*, the network 36 illustrates an extreme example where 58 clients are connected to the two servers 14 and 26. FIGS. 2*h'* and 2*h''* show a fully "stabilized" or "optimized" network where the path or "link" from any client to a server is as short as possible, i.e. where there is few "hops" as possible. It should be noted that the optimization occurs dynamically during operation and without complex algorithms and look-up tables. As will be discussed in greater detail subsequently, the optimization occurs when clients "hear" transmission from other clients that have a better (i.e. shorter) path to a server.

FIG. 2*h'* shows the network as seen from the point of view of servers 14 and 26 and from the point of views of clients 1–client 31. In FIG. 2*h''*, the network as seen from the point of view of clients 32–60, along with statistics for the overall network, are shown. In brief, in a universe of 60 nodes, of which are two are servers and 58 are clients, the average hop distance from a client to a server is 2.36206897 hops.

In FIG. 2*i*, the process of adding a new client 9 to the server is illustrated. The first time that client 9 came "alive" (i.e. became operational) it took five tries before node 9 found a client neighbor with the path to the server. The reason that it may take many tries to find a connection path is that multiple neighbors of client 9 are responding to client 09 "I Am Alive" message via CSMA/CD (Carrier Sent Multiple Access/Collision Detection) protocol. The likelihood that any particular neighbor of client 9 will respond first is, essentially, random. Once client 09 hear from a neighbor that it does not have a path to a server, client 9 tells that neighbor not to respond to the next "I Am Alive" announcement from client 9. In consequence, client 9 keeps trying to find a path to the server until it succeeds. However, that path may not be the shortest path. In this example, the client 9 finds a path to the Internet server, resulting in the updating of the routing table for the Internet server 14 as 14(05(06(07(08(09)))),04,03). The route or "link" from client 9 to the server is: 09>08>07>06>05>14.

In FIG. 2*j*, a client 29 is finding a route to the server via one of its neighbors. It finds a route through client 19, and is added to the routing table of client 19 as its left son. The routing table of server 14 is also updated, and the route from user client 29 to the server is determined. However, this route is not an optimal route in that it includes a greater number of hops than necessary.

In FIG. 2*k*, the "stabilization" or "optimization" process is illustrated. It was previously noted that the client 29 has a non-optimal path to its server. In order to improve this path, client 29 will receive "help" from its neighbors starting with client 7. Client 7 currently has a route to server 14. Client 7 starts randomly probing its neighbors looking for a shorter route to a server. Client 7 finds a shorter route to client 26. Client 7 informs server 14 to drop client 7 from server 14's routing table, and client 7 informs server 26 to add client 7 to its routing table. Since client 29 was "downstream" from client 07, client 29 dynamically becomes switched to a route to server 26.

In FIG. 2*l*, this process is repeated for client 08. Notably, client 8 shortens its route to server 26 by 1 hop. Client 9 cannot improve its route to server 26.

In FIG. 2*m*, client 18 shortens its route to server 27 to 2 hops. This is despite the fact that the route through clients 07 and 08 are a relatively efficient 3 hop links.

In FIG. 2*n*, client 29 is optimizing its path. Client 29 eliminates 18 from its route by "leap frogging" past client 18 with the result of the shortest possible 3 hop route to a server. Ultimately, therefore, client 29 route has improved from a 7 hop path through server 14 to the shortest possible 3 hop path to server 26. This result is dynamically accomplished with the efficiencies of client 7, 8, and 18 also improving, and without the need for complex routing algorithms.

In FIG. 2*o*, another example of individual dynamic routing is illustrated for client 44. This client node shortens its route from 3 to 2 hops by switching server destinations. Client 44 drops out of the server 14's routing table and gets added to server 26's routing table.

The advantage of prototyping the system as explained in FIGS. 2*a*–2*o* is that further optimizations become apparent. For example, if a great deal of network traffic is going through a particular node, it may be desirable to place a "passive repeater" at that node. A passive repeater is not a client, per se, but, rather, is a transceiver that receives and rebroadcasts packets. The passive repeater therefore effectively extends the range of the transmitting clients, and reduces data bottlenecks in the system. A passive repeater is also useful for clients with long links to a server in that it can shorten the link by effectively allowing the clients to skip some intermediate links. The prototyping of the system is also useful in that it shows that placing servers near the center of the network reduces the average link length (i.e. reduces the average number of client hops) in the network.

Figure 3:
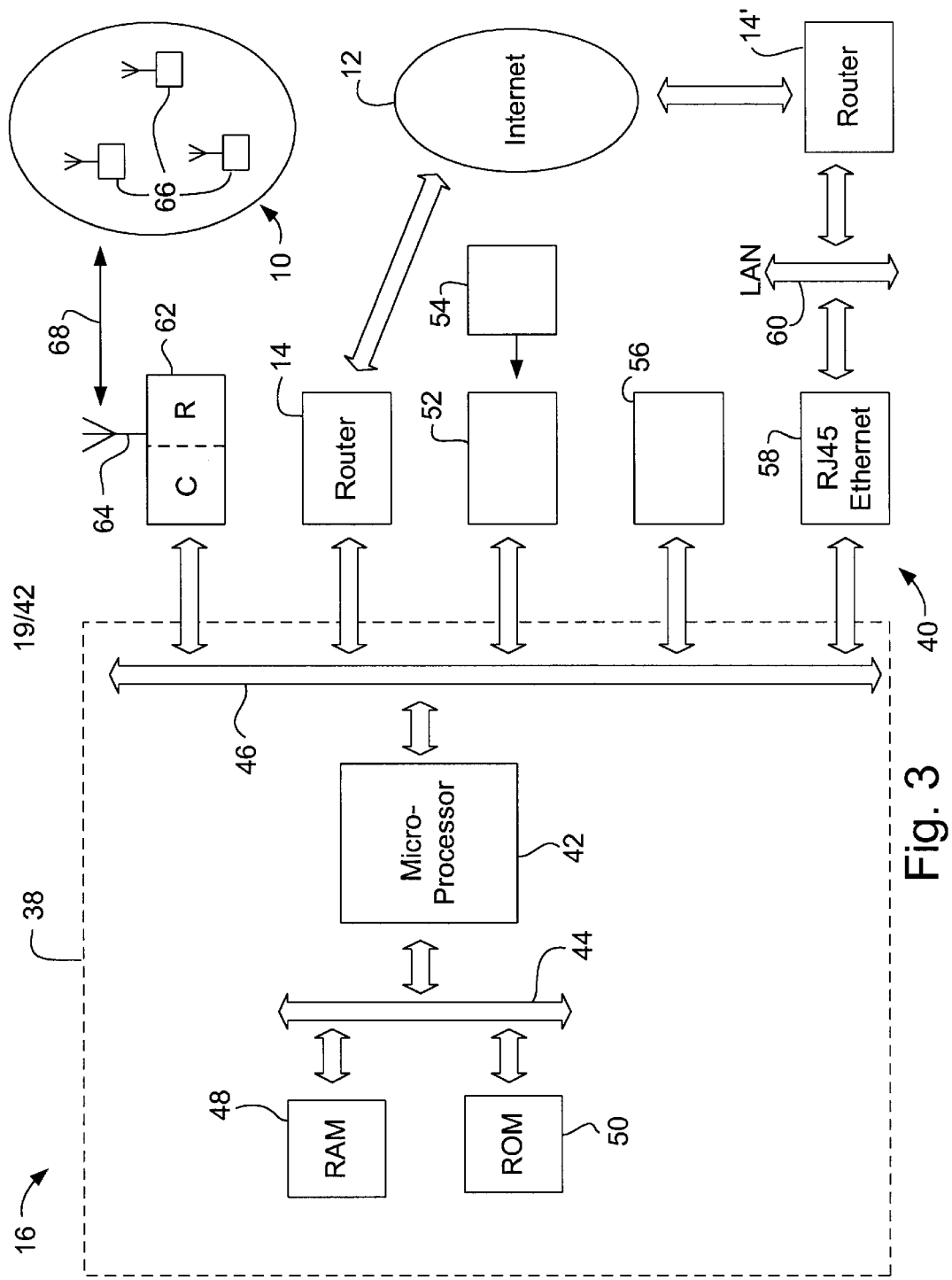
FIG. 3 is a block diagram of a server, router, the first wireless network, and the second network of FIG. 1.

In FIG. 3, a block diagram of the server 16 of FIG. 1 is illustrated. In this instance, the server 16 includes a computer system 38 and a number of peripherals coupled to the computer system. The computer system 38 can be a personal computer system, a computer workstation, or a custom data processor capable of implementing the processes of the present invention.

By way of example, the computer system 38 includes a microprocessor 42 that is coupled to a memory bus 44 and to an input/output (I/O) bus 46. Typically also coupled to the memory bus 44 are random access memory (RAM) 48 and read only memory (ROM) 50. The RAM 48 is usually volatile (i.e. its contents are lost when power is removed) and is used for temporarily or "scratch pad" memory. The ROM 50 is non-volatile (i.e. its contents are not lost when power is removed), and typically includes the start-up instructions for the computer system 38. A number of peripherals are typically coupled to the I/O bus 46. For example, a removable media drive 52 for a removable media 54 (such as a floppy disk, a Zip® disk, or a C/D ROM) is typically coupled to the I/O bus 46, as is a fixed or hard disk 56. Furthermore, a router 14 or bridge can be used to couple the I/O bus 46 to the Internet 12 as previously described. In addition, an RJ45 Ethernet interface 58 can be used to couple the computer system 38 to a local area network 60 and from there to the Internet 12 by a router 14', or the like. Also, a radio modem 62 (including a control section C, a radio section R, and an antenna 64 coupled to the radio section R) can be coupled to the I/O bus 46. The radio modem 62 can communicate with the network 10 including a number of nodes 66 by a wireless transmission or "radio link 68." The assembly of the hardware of the server illustrate in FIG. 3 will be apparent to those skilled in the art.

Figure 4:
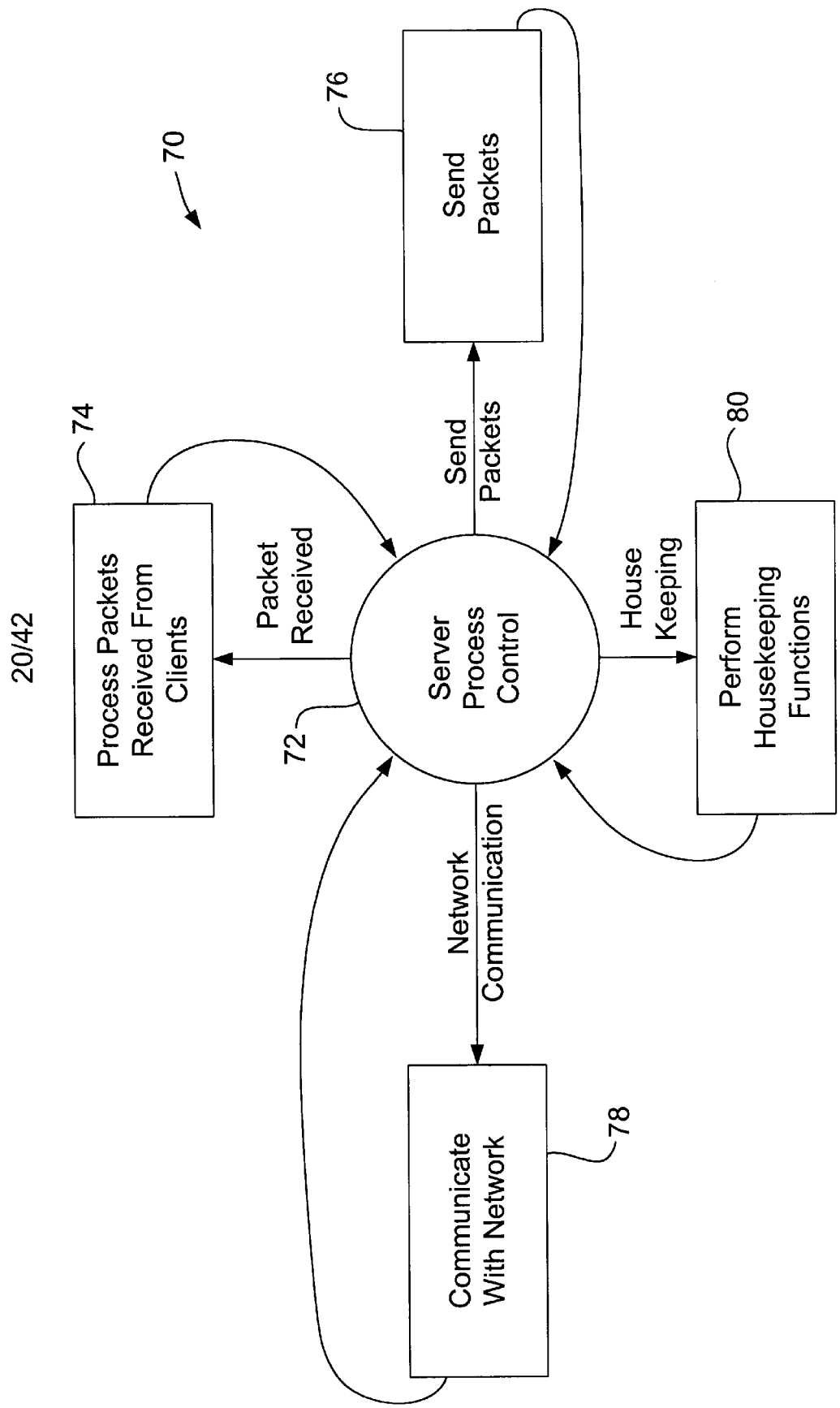
FIG. 4 is a flow diagram of a server process of the present invention operating on the server of FIG. 3.

In FIG. 4, a server process 70 of the present invention is implemented on the server 16. More particularly, the server process 70 can be implemented on computer system 38, within the control section of the radio modem 62, or partially in both of those places. In the present preferred embodiment, the majority of the server process 70 is implemented on the computer system 38. However, it should be noted that the control section C of the radio modem 62 includes a microprocessor and memory and, with proper program instructions, can be made to implement the process 70 of FIG. 4, freeing the personal computer 38 for other tasks.

The server process 70 includes a server process control 72 and four subprocesses. More particularly, the subprocesses include a process 74 which processes packets received from clients, a process 76 which sends packets, a process 78 which communicates with the network, and a process 80 which performs housekeeping functions. Each of these processes will be discussed in greater detail subsequently.

Figure 5:
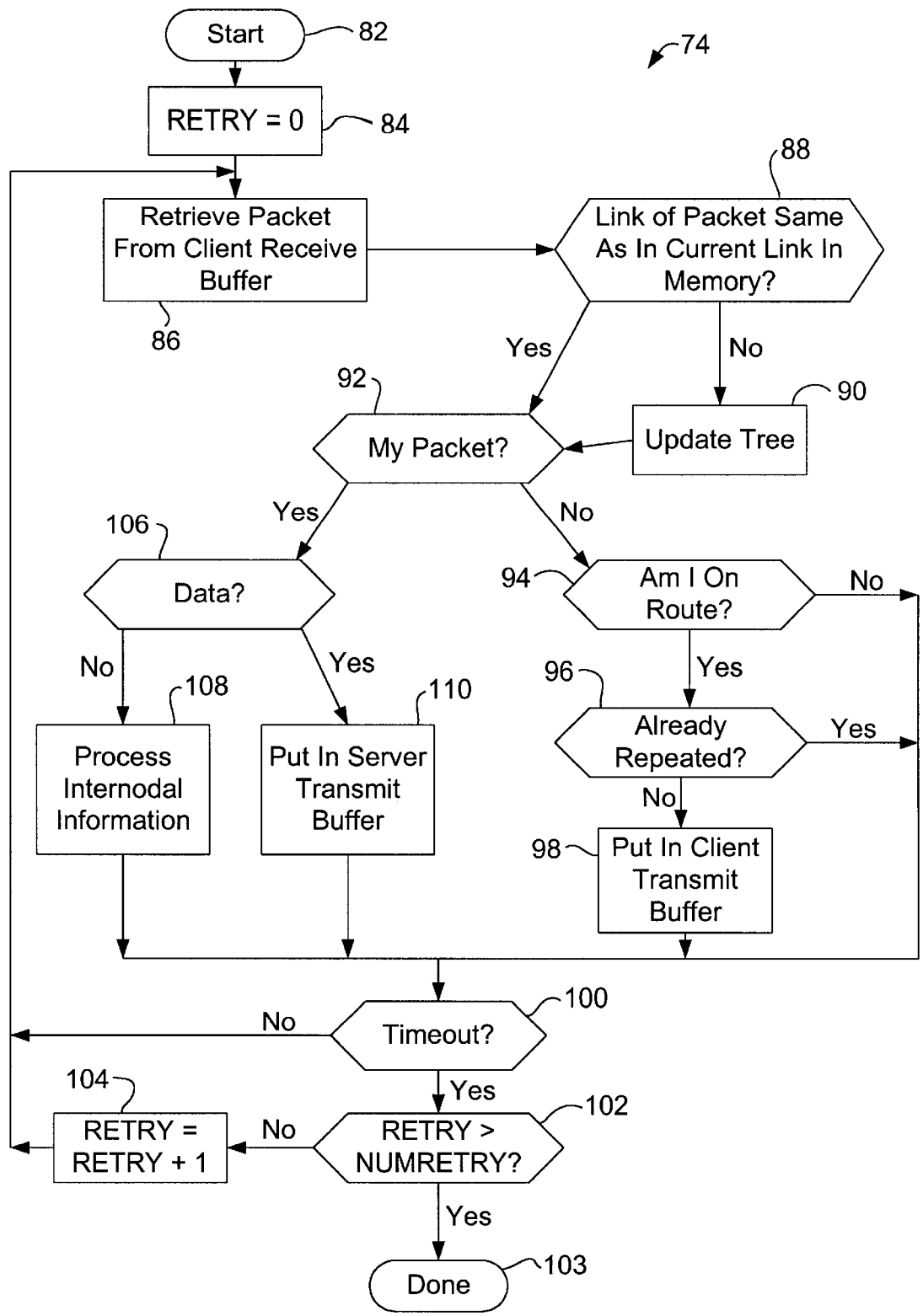
FIG. 5 is a flow diagram of the "Process Packets Received From Client" step of FIG. 4.

In FIG. 5, the process "Process Packets Received From Clients" 74 of FIG. 4 is illustrated in greater detail. The process 74 begins at 82, and in a step 84, the variable RETRY is set to 0. Next, a step 86 retrieves a packet from the client receive buffer, and a decision step 88 determines whether the path or "link" of the packet is same as the currently stored link in memory. If not, a step 90 updates the tree. If so, or alter the updating of the tree in step 90, a decision step 92 determines whether it is "My Packet?" In other words, step 92 determines whether the packet being received by the server was intended for that server. If not, a decision step 94 determines whether that server is on the route. If that server is on the route, but it is not its packet, a decision step 96 determines whether the packet has already been repeated. If not, the packet is placed in the client transmit buffer. If decision step 94 determines that the server is not on the route, or the packet has already been repeated, or upon the completion of step 98, a decision step 100 looks for time-out. The time-out is provided by the server process control 72 such that the computer hardware resources on which process 70 are implemented can be shared among the four processes. More particularly, in most instances, the computer hardware resources are shared among the subprocesses 74–78 in a "round-robin" fashion well-known to those skilled in the art. However, it should be noted that at times the strict round-robin scheduling is not adhered to, as will be discussed subsequently.

If step 100 determines that a time-out has occurred, the decision step 102 determines whether the retry number RETRY is greater than the number of retries allowed, namely NUMRETRY. In its preferred embodiment, the number of retries RETRY are set at, perhaps, 2 or 3 so that the server does not tie up its resources with endless retries of the process. If RETRY is greater than NUMRETRY, the process is completed as indicated at 103. Otherwise, a step 104 increments RETRY by 1. In the absence of a time-out and in the absence of the number of retries being used up, process control returns to step 86.

If step 92 determines that the packet is for that server, a step 106 determines whether the packet is a data type. If not, a step 108 processes "internodal information." If so, a step 110 places the data in a server transmit buffer. After the completion of steps 108 or 110, process control is returned to step 100 to determine if there is a time-out.

In FIG. 5a, a "data packet" 112 in accordance with the present invention is illustrated. As it will be appreciated by those skilled in the art, a data packet is an associated string of digital information that is transferred and processed as a unit. The data packet 112 of the present invention includes a header 114, a type 116, and data 118. The data 118 can be standard TCP/IP data. The header 114 includes the source address, the address of all hops along the way (i.e. the "link" of the data packet), and the destination address. Hops (i.e. clients and servers) that already have been traversed (i.e. have already forwarded the data packet) are indicated with an asterisk ("*") symbol. The type 116 is, in this implementation, a two digit code indicating the type of the data packet 112, as will be discussed in greater detail subsequently. The data section 118 of the data packet 112 includes the data associated with that packet. In the present invention, the data section is in the range of 128–1024 bytes in length.

In FIGS. 5b and 5c, respectively, the decision steps 94 and 106, respectively are illustrated with respect to the data packet architecture of FIG. 5a. The decision step 94 ("Am I On Route?") of FIG. 5 is simply determined by the process 120 "My Address In the Header?" If yes, the process of FIG. 5 branches to step 96, and if no, the process of FIG. 5 branches to step 100. In FIG. 5c, the decision step 106 "Data?" simplifies to a process 122 "Is the Type Equal to 14?" This is because, in the present invention, a type 14 has been arbitrarily chosen to indicates a data type. If yes, the process of FIG. 5 branches to step 100, and if no, the process of FIG. 5 branches to step 108.

Figure 6:
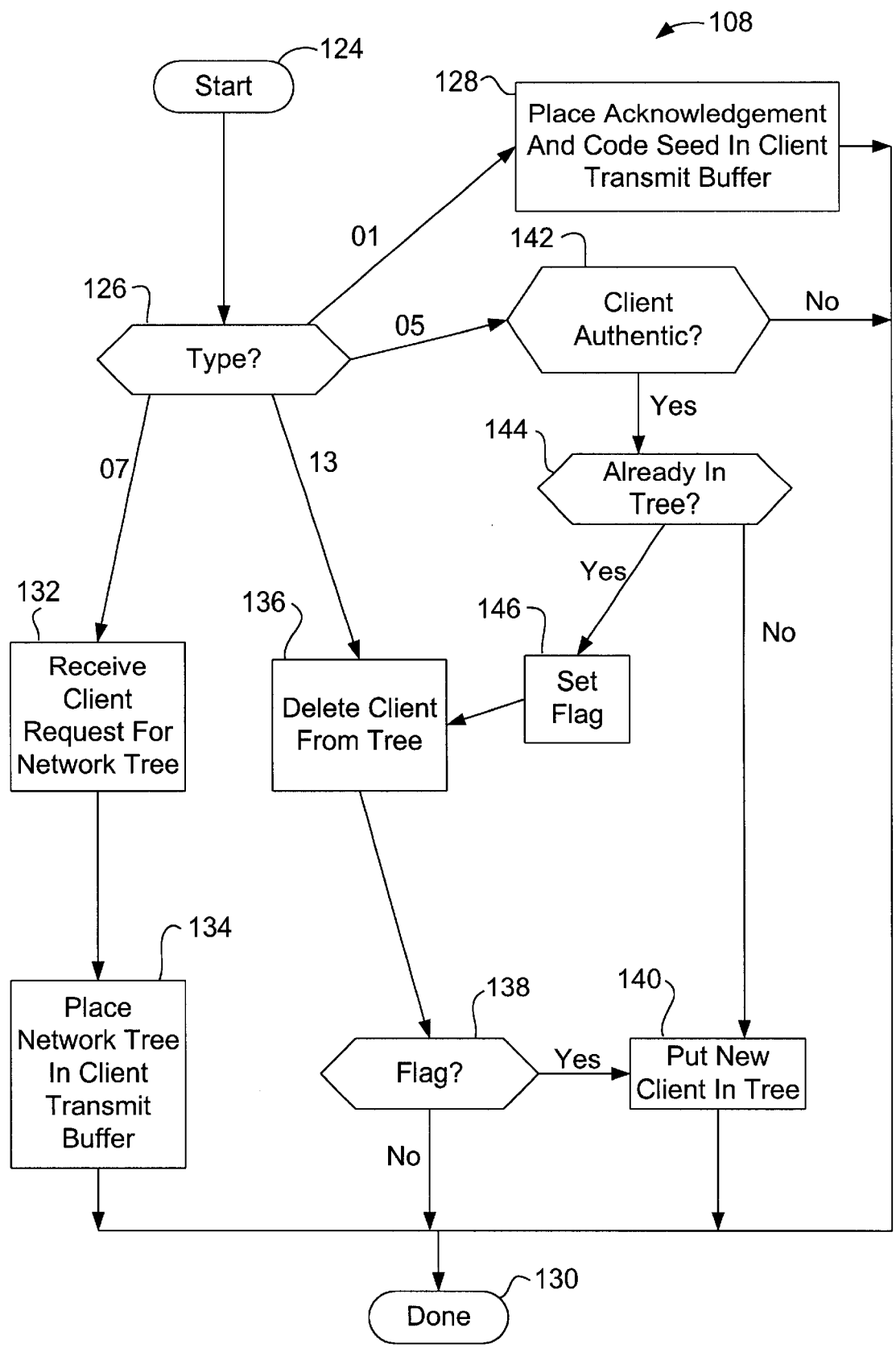
FIG. 6 is a flow diagram illustrating the "Process Intemodal Information" process of FIG. 5.

In FIG. 6, the step 108 "Process Internodal Information" of FIG. 5 is explained in greater detail. The process 108 begins at 124 and, in a multi-branch decision step 126, the type of the data packet is determined. If the type is a "01," a step 128 places an acknowledgment and a "code seed" in the client transmit buffer, and the process is completed at 130. Acknowledgments and "code seeds" will be discussed subsequently. If the type is a "07," a step 132 receives the client request for the network tree, and the process places the network tree in the client transmit buffer in a step 134. The process is then completed at 130. If, however, the type is "13," a step 136 deletes the client from the tree and a step 138 determines whether a flag has been set. If not, the process is completed at 130. If, the flag has been set as determined by step 138, a step 140 puts a new client in the tree and the process is then completed at 130.

If decision step 126 determines that the type is "05," a step 142 determines whether the client is authentic. The authentication process, which will be discussed subsequently, keeps unauthorized clients from being added to the network. If the client is not authentic, the process is completed at 130 and the client is not allowed to connect to the server. If step 142 determines that the client is authentic, a step 144 determines whether the client is already in the server tree. If yes, the flag is set in a step 146 and process is control is turned over to step 136 to delete the client from the tree. Since the flag has been set, step 138 branches the process control to step 140 and the new client is placed in the tree, after which the process is completed at 130.

The addition and removal of nodes from trees are well known to those skilled in the art. For example, in the book, incorporated herein by reference, *SNOBOL 4: Techniques and Applications*, by Ralph E. Griswald, Department of Computer Science, University of Arizona, Prentiss-Hall, Inc., © 1975, ISBN 0-13-853010-6, algorithms for placing and removing clients from trees are discussed.

Figure 6A:
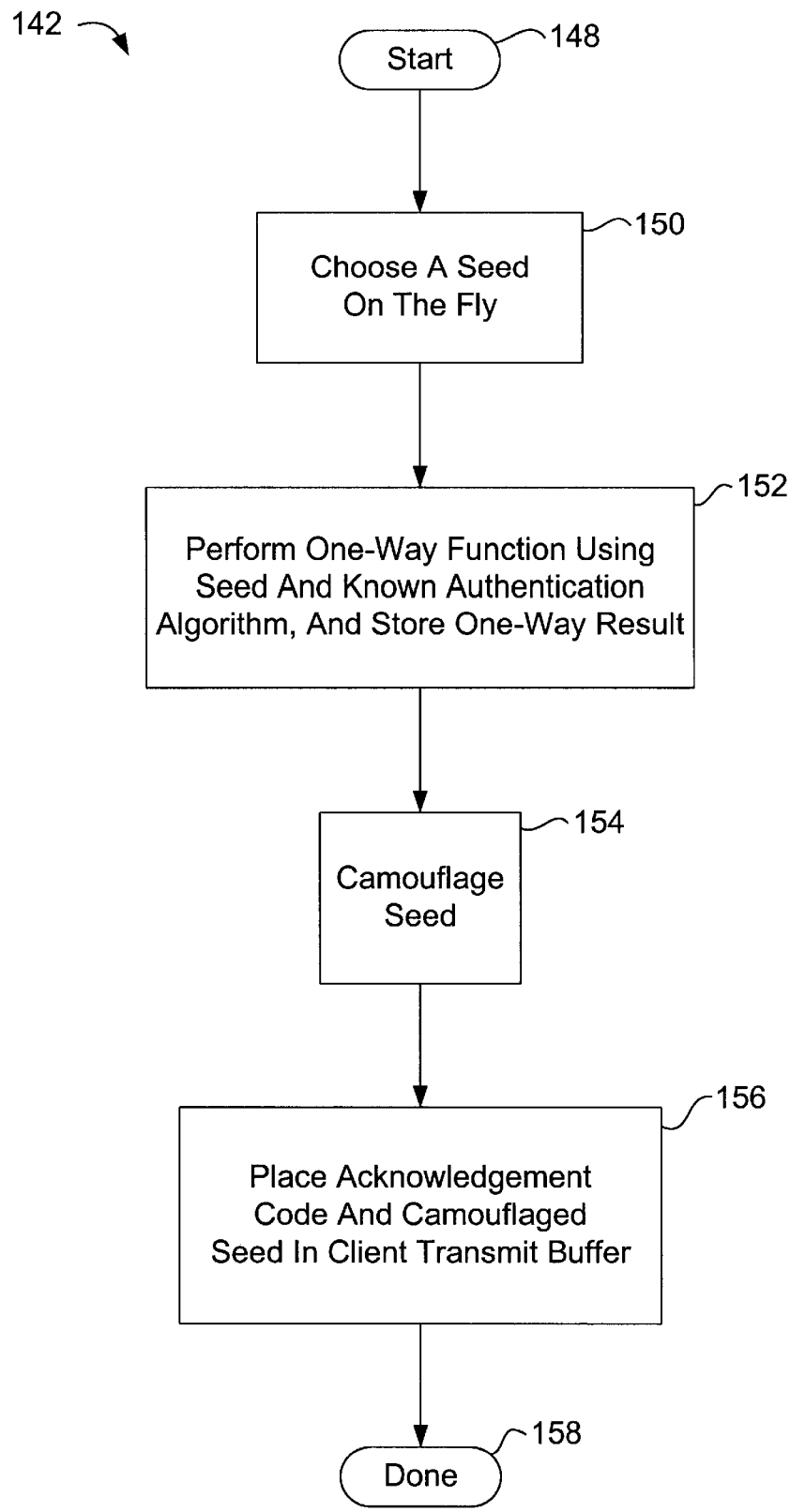
FIG. 6a is a flow diagram illustrating the process "Client Authentic?" of FIG. 6.

FIG. 6a illustrates the process 142 of FIG. 6 in greater detail. More particularly, the process 142 begins at 148 and, in a step 150, a "seed" is chosen on the fly. Next, in a step 152, a "one-way" function is performed using the seed and a known authentication algorithm, and a one-way result is stored. Next, found in step 154, the seed is "camouflaged," and in a step 156, places an acknowledgment code and the camouflaged seed in the client transmit buffer. The process is then completed at 158.

The purpose of the process 142 is to prevent unauthorized "clients" from accessing the network. For example, hackers can be prevented from accessing the network unless they can crack the authentication process, which is nearly impossible.

Authentication techniques are well known to those skilled in the art. For example, the book, incorporated herein by reference, *Algorithms in SNOBOL 4*, by James F. Gimpel, Bell Telephone Laboratories, John Wiley & Sons, a Wiley Interscience Publication, © 1976 by Bell Telephone Labs, Inc., ISBN 0-471-30213-9, describes authentication techniques using one-way seeds. See, in particular, pp 348–349 with back-references. In brief, a "seed" is chosen "on the fly", such as by reading the system clock. The one-way function modifies the seed using an algorithm known to both the server and the clients. The one-way result, which in this instance is 4 bytes in length, is stored. The step 154 then "camouflages" the seed by dispersing the 4 bytes among perhaps 26 other bytes prior to transmitting the camouflaged seed. The receiving clients know which of the four bytes to use for their one-way function.

Figure 6B:
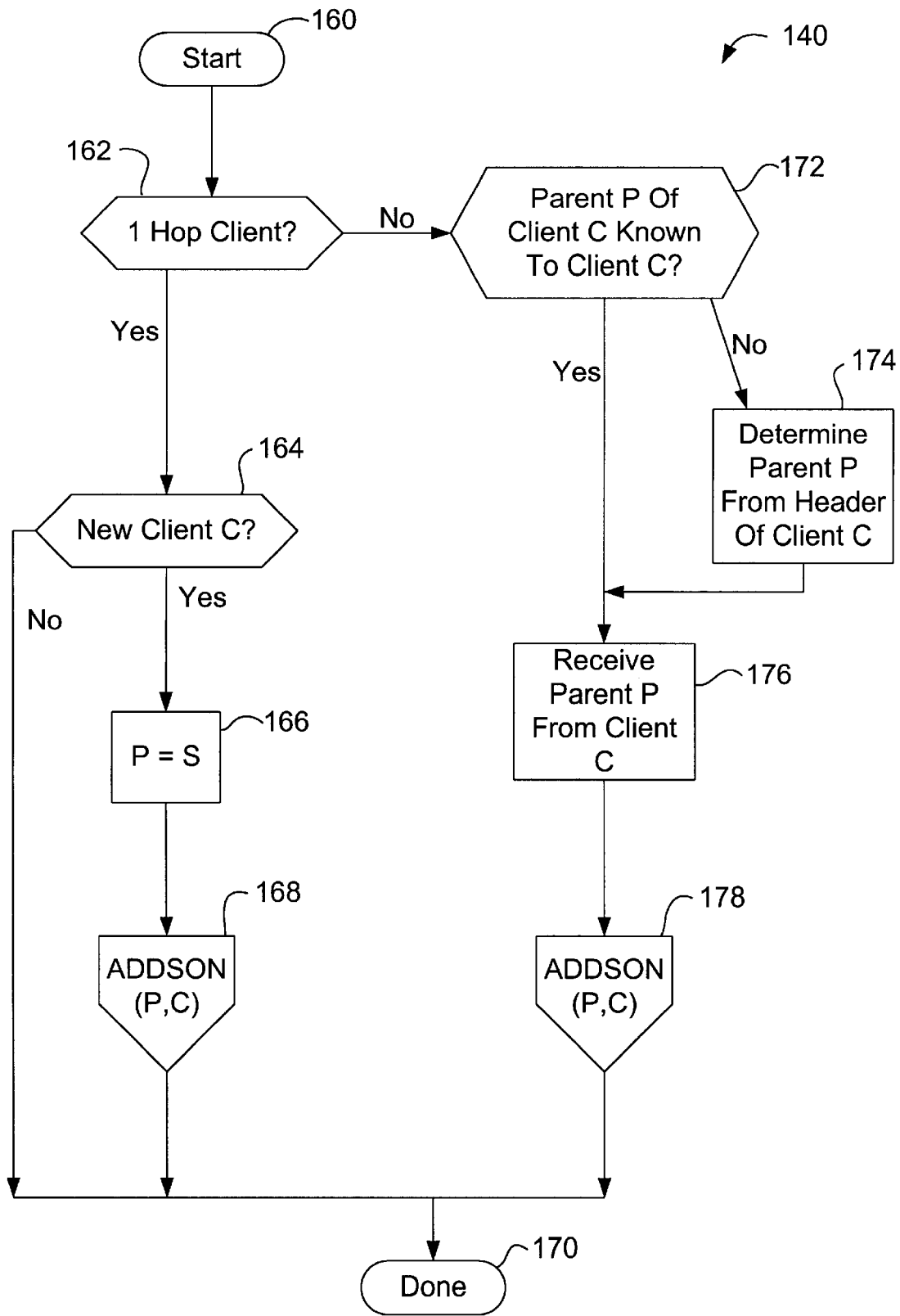
FIG. 6b is a flow diagram illustrating the process "Put New Client In Tree" of FIG. 6.

The process 140 "Place New Client In Tree" of FIG. 6 is illustrated in greater detail in FIG. 6b. The process 140 begins at 160 and in a step 162, it is determined whether this is a "1 hop" client. If so, a decision step 164 determines whether it is a new client C. If so, the variable P is set to S and the function "ADDSON" with the variables (P, C) is evoked. S, of course, is the server or root of the tree. If step 64 determines that it is not a new client C, or after the completion of the ADDSON function, the process ends at 170.

If step 162 determines that it is not a 1 hop client (i.e. C is a multi-hop client) a step 162 determines whether the parent P of client C is known to client C. If not, a step 174 determines the parent P from the header of client C. If the client C does know its parent, or after the completion of step 174, a step 176 receives parent P from client C. Next, in a step 178, the function ADDSON(P,C) is evoked, and the process is completed at 170.

Figure 7:
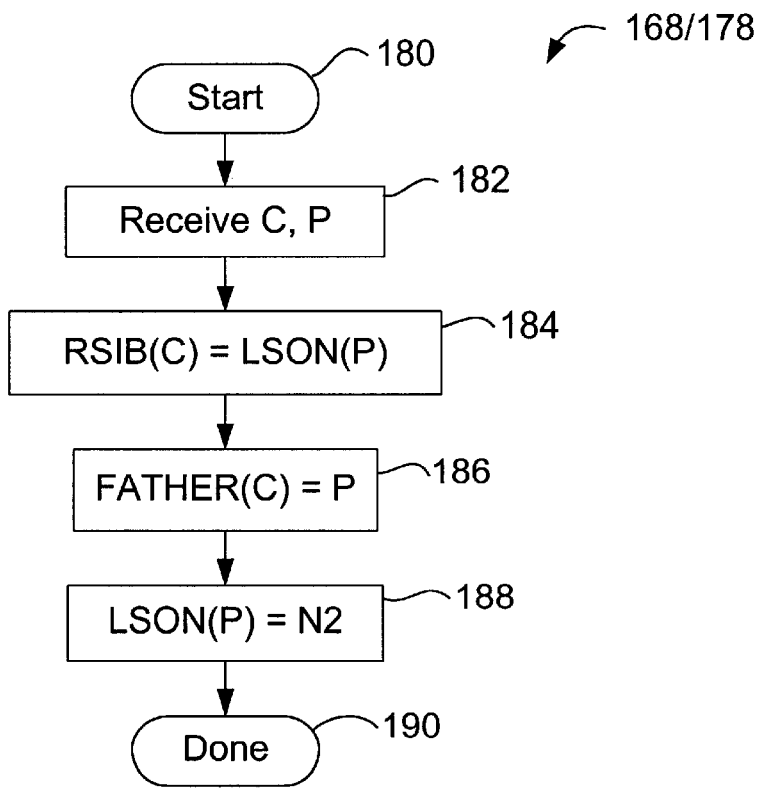
FIG. 7 is a flow diagram illustrating the function "ADDSON(P,C)" of FIG. 6b.

In FIG. 7, the ADDSON(P,C) function is explained in greater detail. More particularly, function steps 168–178 begin at 180 and, in a step 182, the variables C, P are received. In this notation, the string RSIB( ) refers to a string of right siblings, and the notation LSON( ) refers to a string of left sons. A step 184 sets RSIB(C)=LSON(P). A step 186 sets a string FATHER(C)=P and a step 188 sets the string LSON (P)=N2. The variable N2 is an in-memory pointer that points to the memory location of nodes. The string FATHER provides a pointer from a child C to its father, which in this case is P. The process is then completed as indicated at 190.

Figure 7A:
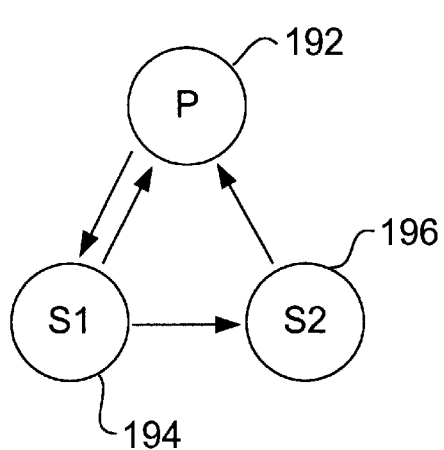
FIGS. 7a and 7b are used to illustrate the operation of the ADDSON function of FIG. 7.
Figure 7B:
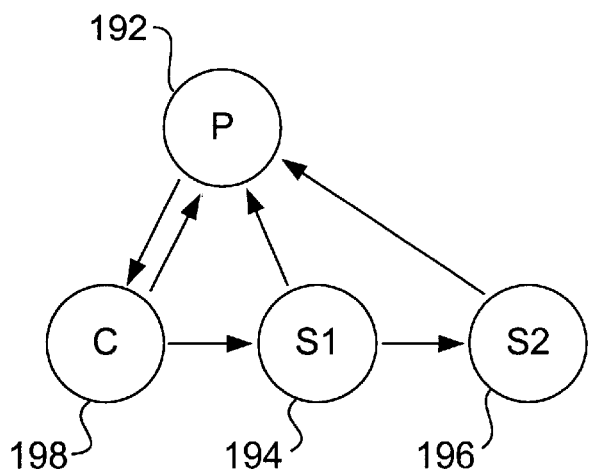

In FIGS. 7a and 7b, the ADDSON function is graphically illustrated. In FIG. 7a, a parent 192 has a left son 194 and a right sibling 196. The parent 192 and left son 194 have mutual pointers to each other, while the right sibling 196 has only a pointer to the parent 192. The left son 194 also has a pointer to the right sibling 196. When the ADDSON function is evoked with the argument (P, C) C is added as the left son 198 and the pointer in the parent 192 is updated to point to the left son 198. The left son 198 has pointers to the parent and to the new right sibling 194. The new right sibling 194 still has a point to the older right sibling 196, and both siblings 194 and 196 have pointers to the parent 192. It should be noted, under all circumstances, that the parent is only directly aware of the left son, in that it only has a pointer to the left son.

Figure 8:
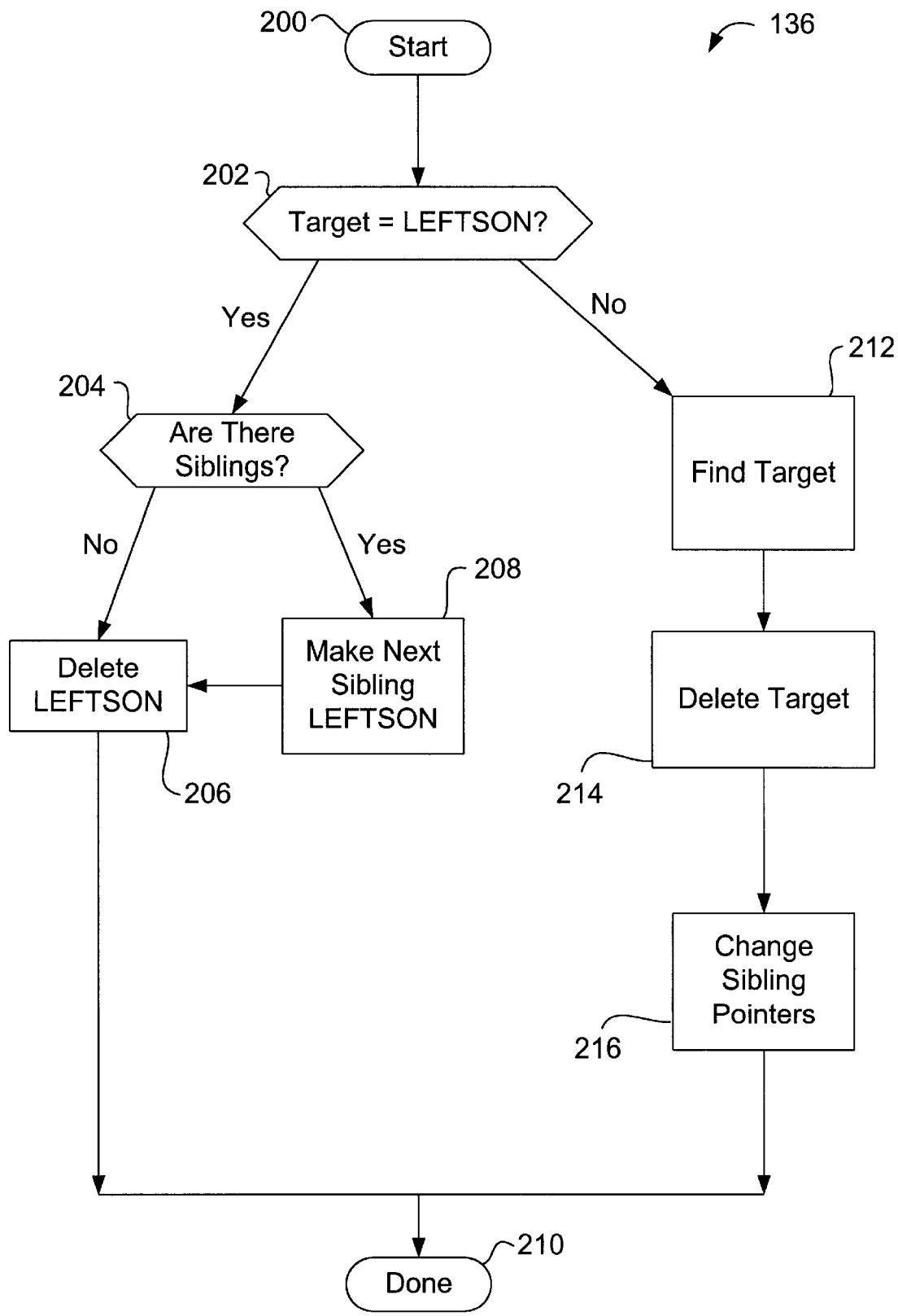
FIG. 8 is a flow diagram illustrating the "Delete Client From Tree" process of FIG. 6.

In FIG. 8, the process 136 "Delete Client From Tree" is illustrated in flow-diagram form. The process 136 begins at 200 and in a step 202, it is determined whether the target is equal to the left son. The "target" is, of course, the client to be deleted. If the target is the left son, a step 204 determines if there are other siblings. If not, the left son is deleted in a step 206. If there are other siblings, a step 208 makes the next sibling the left son, and then the left son is deleted by step 206. The process is then completed at 210. If step 202 determines that the left target is not equal to the left son, the target is found in a step 212, and is then deleted in a step 214. A step 216 then changes the sibling pointers, and he process is completed at 210.

Figure 8A:
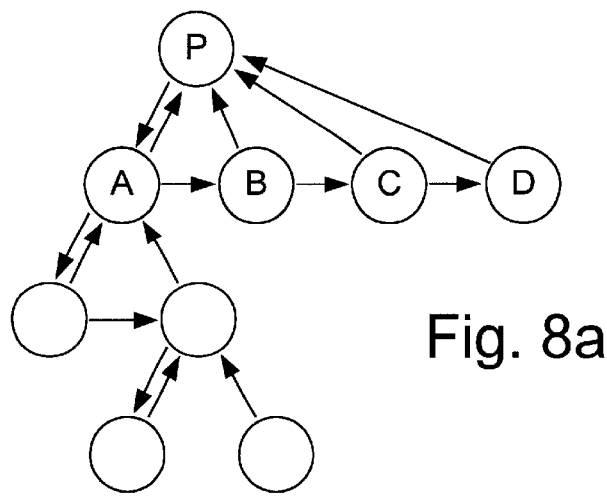
FIGS. 8a–8c illustrate the process of FIG. 8.
Figure 8B:
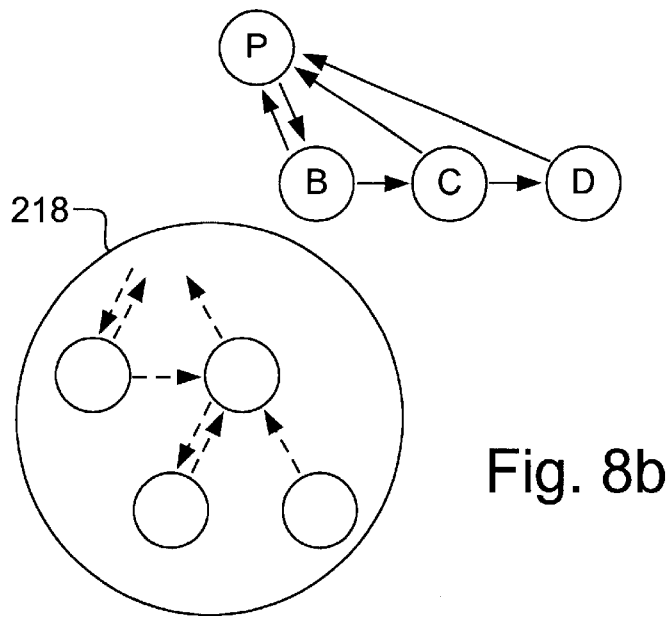
Figure 8C:
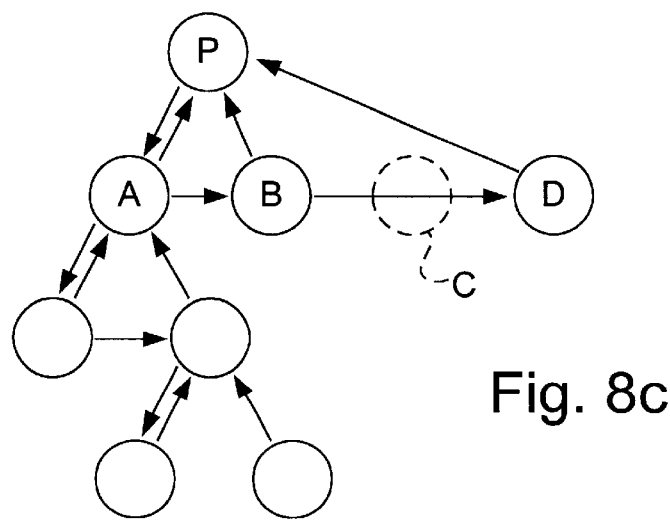

FIGS. 8a–8c are several scenarios used to illustrate the process of FIG. 8. Assume that there is a tree structure as illustrated in FIG. 8a. If the node "A" (i.e. a client A) of FIG. 8a "disappears" all nodes (clients) 218 that used client A as a path to the server P are dropped from the network as illustrated in FIG. 8b. With reference again to FIG. 8a, if the node C disappears, the sibling B will simply reset its pointer to point to sibling D without any loss of service to any of the nodes. The lost nodes 218 of FIG. 8b will need to re-establish themselves into the network as previously described.

Figures 9A, 9B, 9C:
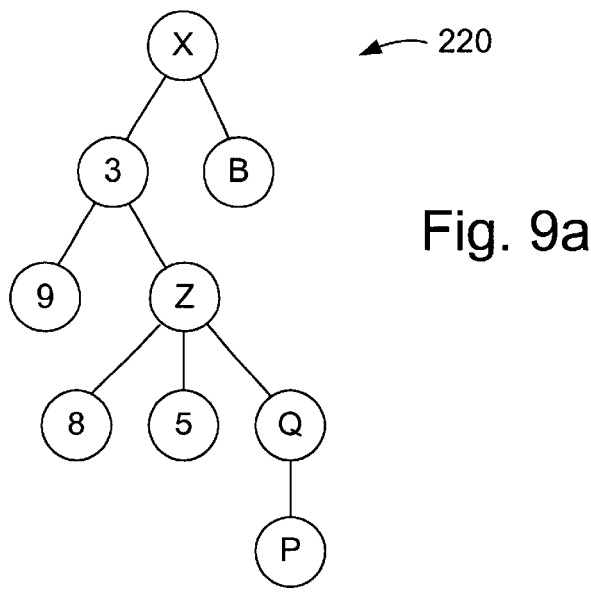
FIGS. 9a–9c illustrate the "Place Network Tree In Client Transmit Buffer" of FIG. 6.

FIG. 9a is a tree structure that will be used to illustrate the step 134 "Place Network Tree In Client Transmit Buffer" of FIG. 6. Since the tree structure 220 is a logical construct, it must be represented in a form suitable for digital transmission. This form is illustrated in FIG. 9b as a string 222. With reference to both FIGS. 9a and 9b, the string 222 represents the tree on a top-to-bottom, left-to-right basis. Therefore, the string 222 indicates for the parent X that its left son is 3 with a right sibling B. For the parent 3, there is a left son 9 with a right sibling Z. For the parent Z, there is a left son 8, a right sibling 5, and another right sibling Q. For the parent Q, there is a left son P. Therefore, the tree structure 220 has been completely and compactly represented by the notation of the string 222.

The converting of trees to strings and the reverse is well known to those skilled in the art. In short, a left parenthesis in the string indicates that a left son follows, and a comma in the string indicates that a right sibling follows. For example, the aforementioned book *SNOBOL 4: Techniques and Applications* describe the process for converting trees to "prefix form" as described above, and vice versa. The aforementioned book *ALGORITHMS IN SNOBOL 4* likewise describes the process.

While the tree structure 9a is useful for representing and traversing a tree data structure, it is not well-adapted for rapid searching for particular nodes. For this purpose, the table of FIG. 9c is created to implement fast searching and other housekeeping functions. In this illustration, the table of FIG. 9c includes four columns. The first column is the sequential element or "node" number, a second column 226 is the node name, the third column 228 includes the time stamp of the creation of the node, and the fourth column includes the actual physical memory location of the node. In this way, a particular node can be searched by element number, node name, time stamp, or memory location without resorting to the time consuming recursive search algorithms otherwise typically used to search tree structures.

Figure 10:
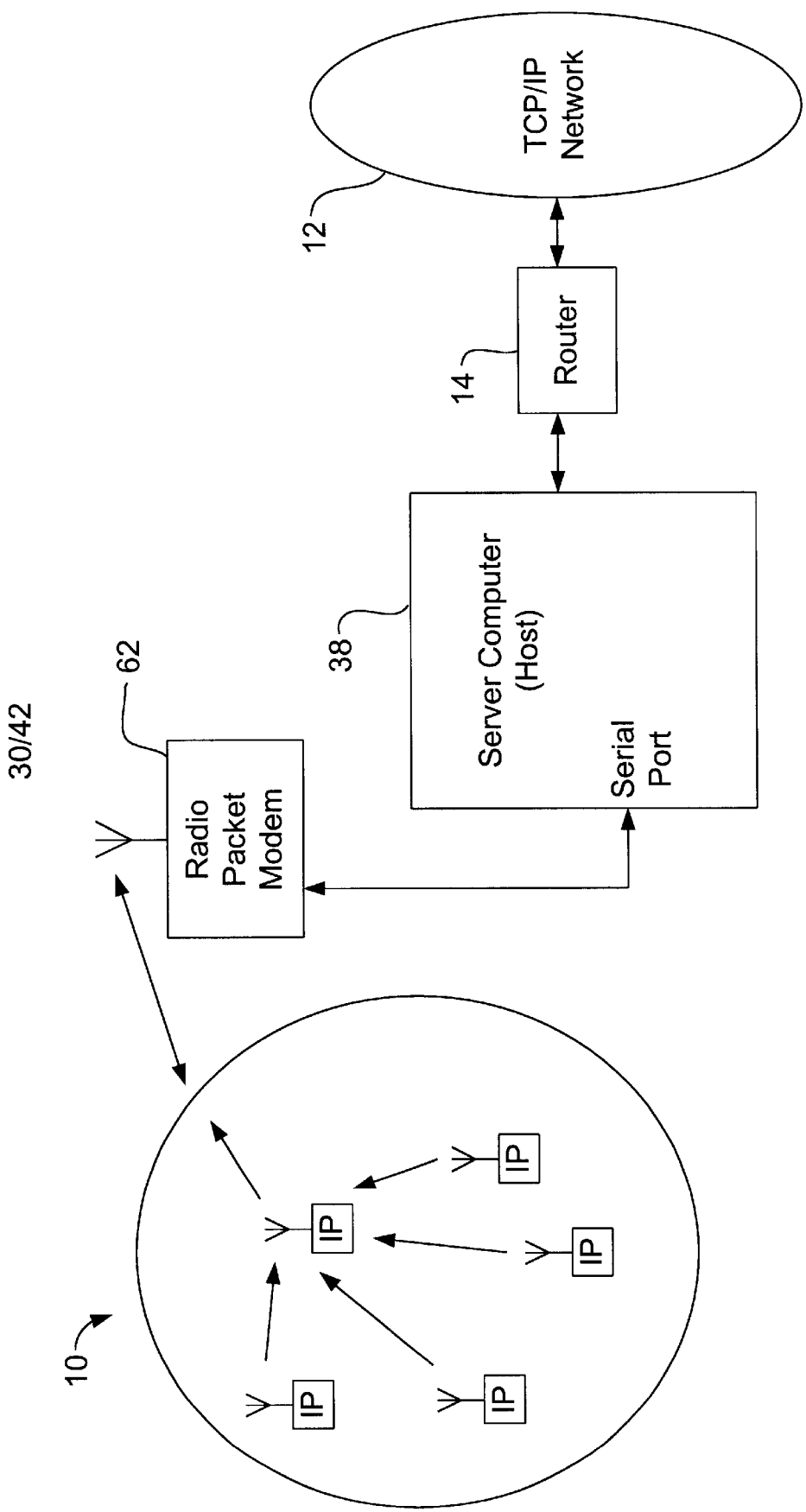
FIG. 10 is a pictorial representation of the "Communicate With Network" process of FIG. 4.

FIG. 10 is a pictorial representation of a portion of the server of FIG. 3 that has been simplified to explain the steps 78 of FIG. 4 "Communicate With Network." The wireless network system 10 includes a number of clients and, perhaps, other servers, each of which has its own IP address. The radio modems of those clients and servers communicate with radio modem 62 of the server which provides digital data to the serial port of a server computer or host 38. A router, bridge or other device is used to connect the server to a network, such as a TCP/IP network 12. Of course, the radio packet modem 62 and the server computer 38 can be considered part of the wireless network system 10 as described previously. The combination of the server and the router or the like performs a "gateway" function, in that it provides translation services between the two networks 10 and 12.

Referring back to FIG. 4, the step 76 "Send Packets" simply involves sending the data packets stored in the client transmit buffer to the network 10 through the radio modem 62. Likewise, and in a straightforward matter, the step 78 "Communicate With Network" simply forwards the data stored in the network transmit buffer to the network through the router 14 or through another route, such as the Ethernet interface 58. The "Send Packets" and "Communicate With Network" processes will be easily understood by those skilled in the art. Again, the server process control 72 allocates system resources among the processes 74–80 on a round-robin basis.

Figure 11:
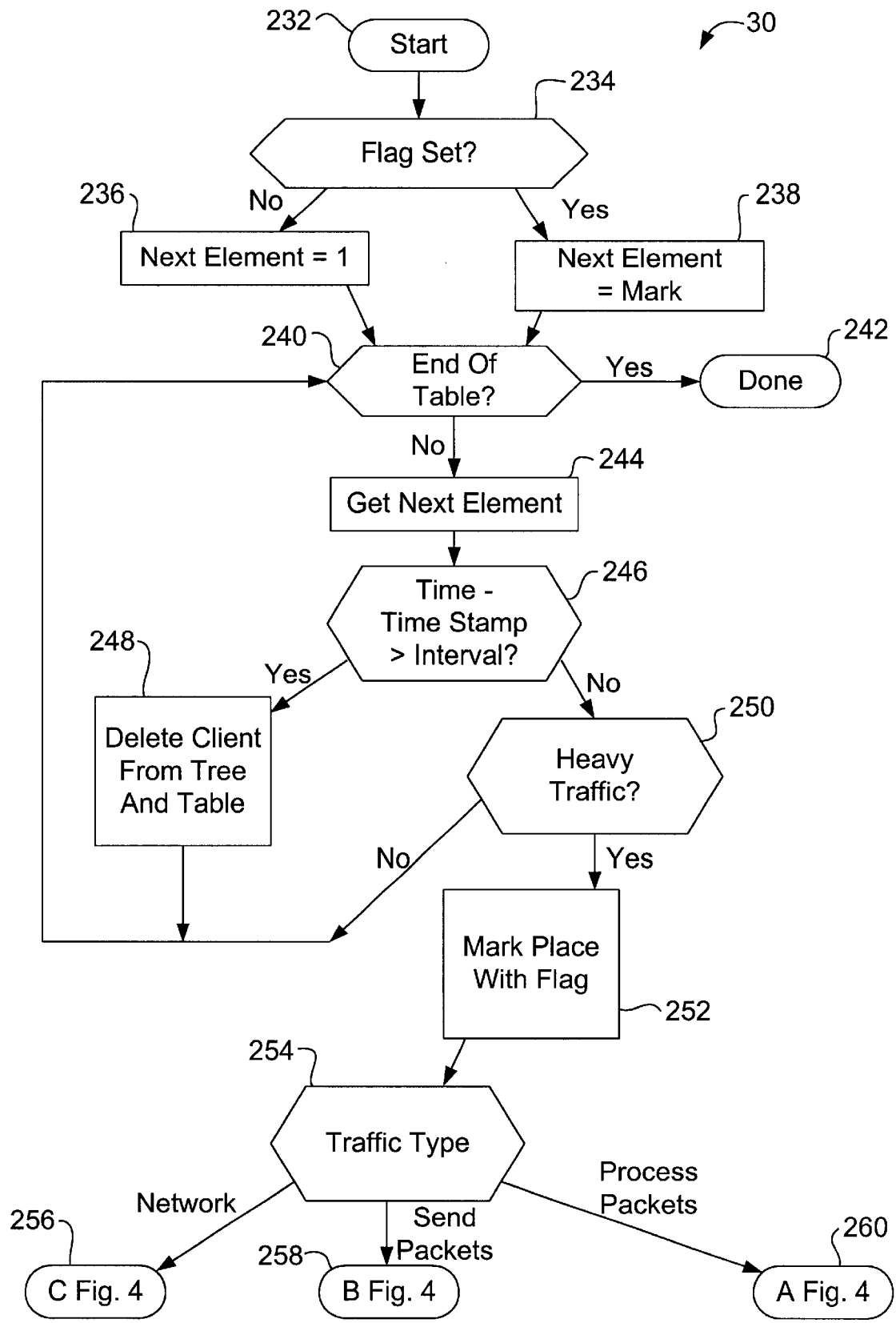
FIG. 11 is a flow diagram of the process "Communicate With Network" of FIG. 4.

In FIG. 11, the housekeeping process 80 of FIG. 4 is illustrated in greater detail. Since the housekeeping function 80 is of generally less importance than the other functions of process 70, it is possible that housekeeping function will be interrupted with a branch to one of function s 74, 76, and 78 of FIG. 4.

More particularly, in FIG. 11, the housekeeping function 80 of FIG. 4 is illustrated in greater detail. The process 80 begins at 232 and, in a decision step 234, it is determined whether a flag is set. If not, the next element is equal to 1, i.e. it is picking the first element on the list. If step 234 determines that a flag is set, the process 80 knows that the housekeeping has been interrupted in the middle of the list and therefore the next element is set equal to the stored mark point as indicated in step 238. Next, a step 240 determines whether if the end of the table has been reached. If so, the process is completed at 242. If the end of the table has not been reached, the next element retrieved in a step 244, and then in a step 246, it is determined whether the current time minus the time stamp is greater than a predetermined interval. If it is, a step 248 deletes the client from the tree and from the table. This step 248 is performed to ensure that a client node that has dropped out the network 10 without informing the server is deleted from the server tree at some point in time. A suitable interval may be 15 minutes, or any desired interval set by a network manager. Process control then returns to step 240.

If step 246 determines that a node (i.e. a client) corresponding to the next element has checked-in within the time INTERVAL, a step 250 determines whether there is heavy traffic on the server. If not, process control is returned to step 240. If there is heavy traffic, a step 252 marks the place in the table corresponding to the current element (i.e. the marked point in the list is stored in memory) and then a step 254 determines the traffic type. Process control then branches to process 256 if it is heavy network traffic, 258 if it is heavy outgoing packet traffic, and process 260 if it is heavy incoming packet traffic.

Figure 12:
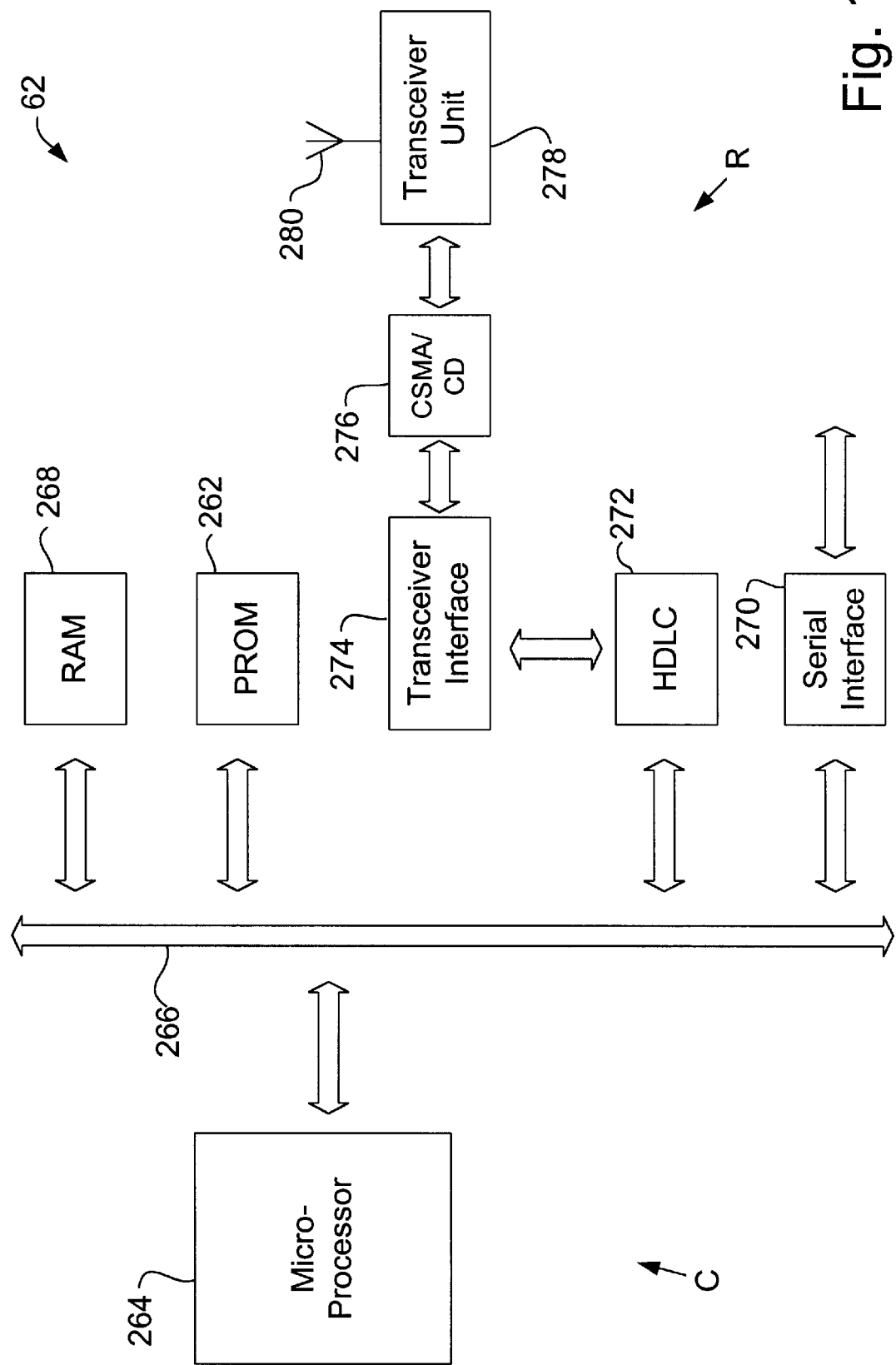
FIG. 12 is a block diagram of a radio packet modem used in the present invention.

In FIG. 12, a radio modem 62 (which can be similar to all of the radio modems described herein) is illustrated in block diagram form. Again, the radio modem 62 is commercially available from GRE America, Inc. as the Gina spread spectrum radio modem, models 6000N-5 or 8000N-5. Spread spectrum technology gives good reliability and some transmission security in that a 127 bit cyclical code must be known by both the transmitting and receiving node. However, for true data security, encryption techniques, well known to those skilled in the art, should be used. Gina modems do include the option of 64 bit built-in encryption as an option.

It should be further noted that the Gina radio modem hardware can be modified to incorporate the server process (or the client process for the client radio modems) of the present invention by storing program steps implementing those processes into a ROM or programmable ROM (PROM) 262 of the radio modem 62.

The radio modem 62 includes a microprocessor 264 coupled to a bus 266. The microprocessor is an Intel 80C188 microprocessor in the present example. The PROM 262 (which currently stores 512 Kbytes of code) is coupled to the bus, as is RAM 268, a serial interface 272, and an HDLC converter 272. Coupled to the HDLC 272 interface is a transceiver interface 274, and coupled to the transceiver interface 274 is a CSMA/CD unit 276. A transceiver unit 278 with an antenna 280 is coupled to the CSMA/CD unit 276.

The devices 272 and 276 are used for error correction and noise cancellation, as will be appreciated by those skilled in the art. The CSMA/CD detects if two packets have "collided" producing indecipherable noise. If so, no acknowledgment of the packet is sent by radio modem 62, and the senders of the two packets will wait a short random period before resending their packets. Since the waiting period is random, there is little likelihood that the packets will collide a second time. The HDLC performs a checksum on the received packets and, if the checksum fails, prevents the sending of the acknowledgment. This will cause the sending node to resend the packet after a random waiting period.

The currently used radio modems operate in the 902–928 MHz frequency range at about 725 mW, and have an outdoor range of up to 12 miles, line-of-sight. These characteristics are a good compromise for a light to moderately dense network. If the network becomes very dense, it may be preferable to reduce the power, since this will reduce the number of clients that hear a given packet. Also, other frequency ranges are also suitable, such as the 2.404 to 2.478 GHz range.

The currently sold Gina spread spectrum radio models have their transmission ("baud") rate artificially limited to 38.4 kHz. However, this artificial limit can be easily removed by a simple change to the program in PROM 262 to allow the modems to operate at 115.2 kHz, or nearly at full ISDN baud rates. At these baud rates, a single server can reasonably support three simultaneous WWW browser sessions and a dozen e-mail sessions. This compares very favorably to cellular networks which, as noted previously, can only support one user at a time. This also compares very favorably to the Ricochet system which, since it is limited to 28.8K baud, is not very useful for WWW browsing.

Figure 13:
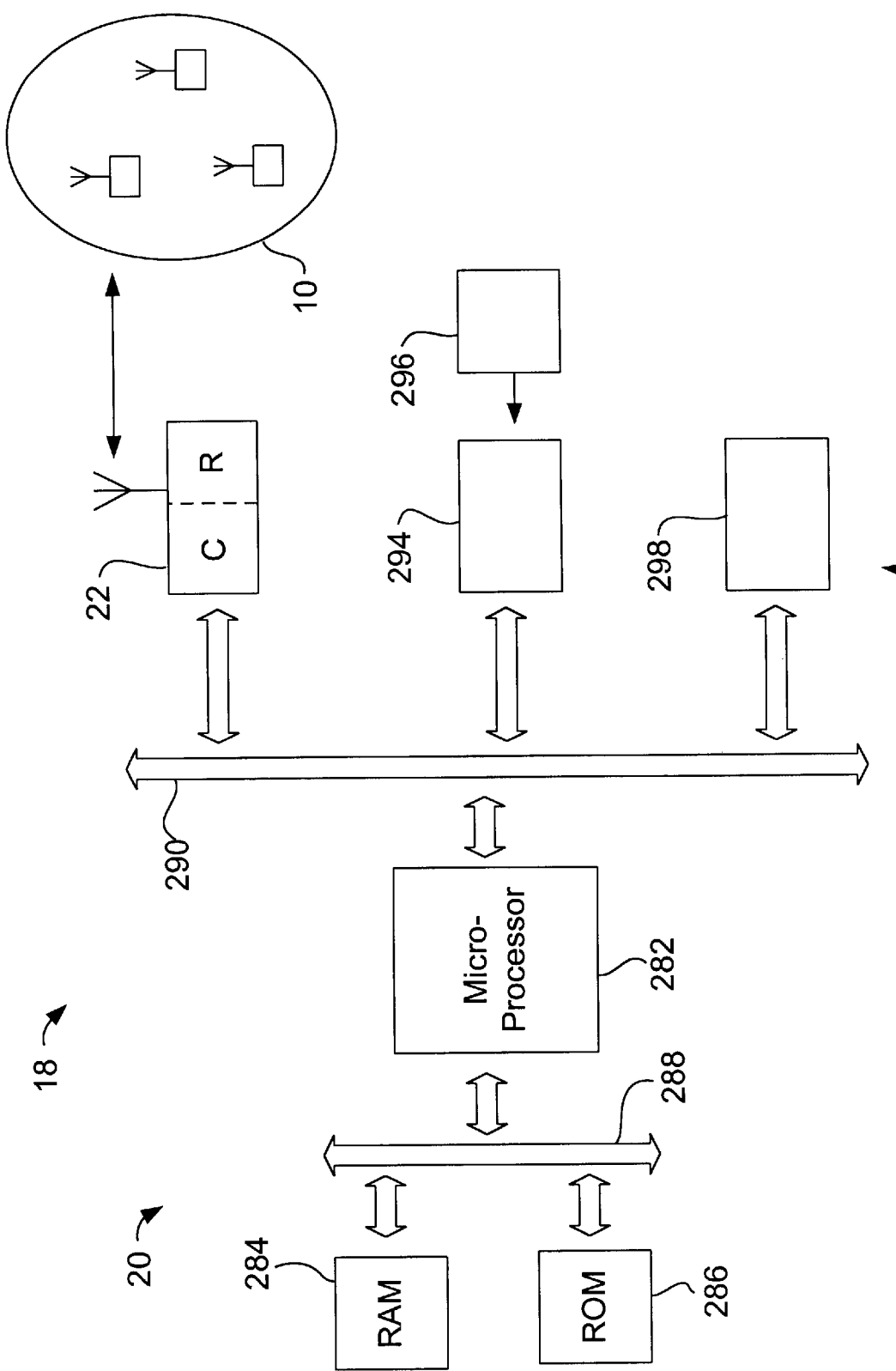
FIG. 13 illustrates a client, such as a client A, B, C, or D of FIG. 1.

In FIG. 13, a client 18 including a computer 20 and a radio modem 22 of FIG. 1 is illustrated in greater detail. Again, the client computer 20 can be any suitable form of digital processor including personal computer, workstation, PDA, etc. A computer 20 includes a microprocessor 282, RAM 284, and ROM 286. The microprocessor is coupled to the RAM 284 and the ROM 286 by a memory bus 288. The microprocessor 282 is also coupled to an input/output (I/O) bus 290 to which a number of peripherals 292 may be attached, including the radio modem 22. As before, the radio modem 22 includes a control C portion and a radio R portion, where the control portion of the radio modem 22 is coupled to the I/O bus 290. With brief reference to FIG. 12, the control portion C is everything but the transceiver unit 278 and the antenna 280, and the radio portion R corresponds to the transceiver unit 278. Also, as before, the client process running on the client 18 can run on the computer 20, in the control C portion of the modem 22, or partially on both processors. The client 18 typically includes other peripherals 292 such as a removable media drive 94 receptive to removable media 296, (such as a floppy disk or a CD ROM) and to a hard disk drive 298. Those skilled in the design of computer system will readily understand how the hardware of client 18 is assembled and used.

In alternate embodiments of the present invention, uninterruptable power supplies and Global Positioning Systems (GPS) are added to the clients 18. The uninterruptable power supplies ensure that the clients stay on the network, and the GPS can be used in conjunction with directional antennas (such as phased array antennas) attached to the radio modems 22 to direct the transmission to the desired next node in the link. This increases the efficiency of the system, and reduces packet "pollution" of the network. The GPS unit can be coupled to I/O bus 290, or can be incorporated into the radio modem 22.

Figure 14:
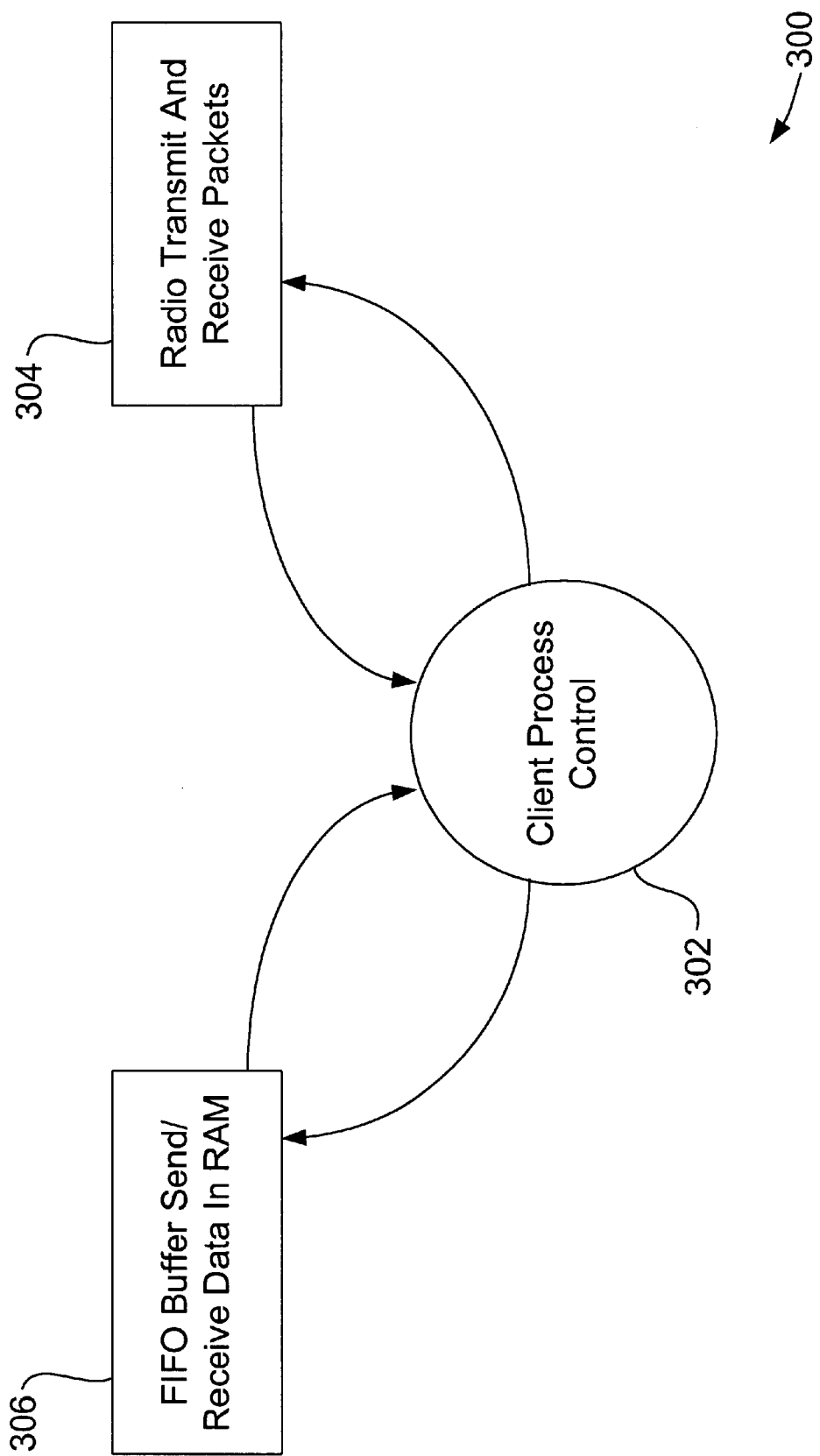
FIG. 14 is a flow diagram of a client process running on the client on FIG. 13.

In FIG. 14, a client process 300 is implemented in the hardware of client 18. Again, this process can run on the microprocessor 282, or it can be partially or wholly run on the microprocessor of the controller C of the radio modem 22. In this current preferred embodiment, the process 300 runs on the computer portion 20 of the client 18. The client process 30 includes a client process control 302, a process 304 for radio transmitting and receiving data packet, and a process 306 for maintaining a first-in-first-out (FIFO) buffer for send and receive data packets in the RAM 284 of the computer 20.

Figure 15:
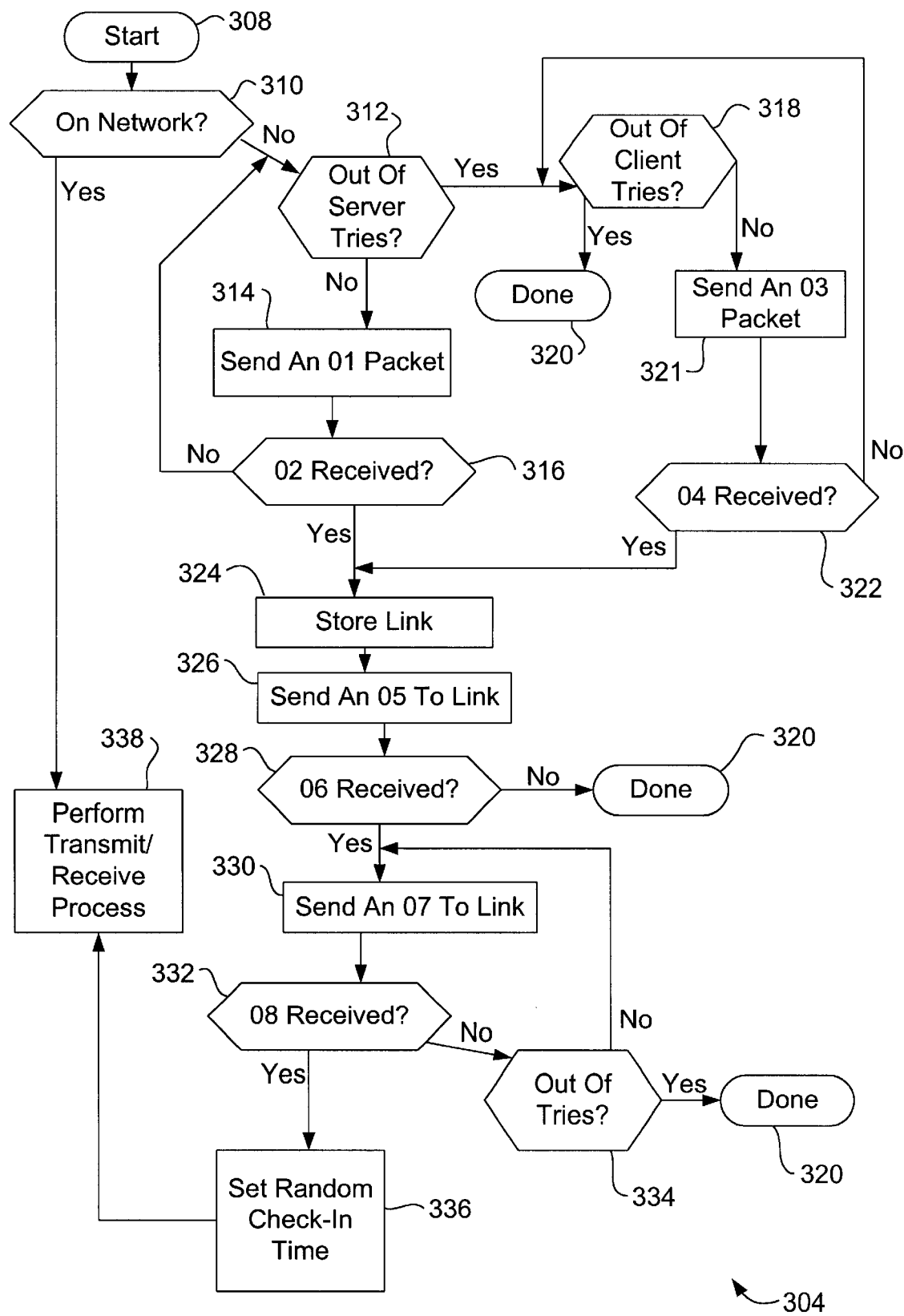
FIG. 15 is a flow diagram of the process "Radio Transmit and Receive Packet" of FIG. 14.

In FIG. 15, the process 304 of FIG. 14 is described in greater detail. The process 304 begins at 308 and, in a step 310, it is determined whether the client is on the network. If not, the client needs to get on the network before it can send data to the server. This connection process begins at 312 to determine whether it is out of tries in trying to reach the server. If not, it sends a 01 packet in a step 314 and waits to receive a 02 packet from the server or another client in a step 316. If it does not receive a 02 packet in response to 01 packet, process control is returned to step 312 until it runs out of server tries. When it does run out of server tries, process control is turned over to a step 318 which determines whether it is out of client tries. If yes, this particular client cannot reach either a server or another client and the process terminates at 320 with a failure. If it is not out of client tries in step 318, a 03 packet is sent in a step 320 and the client waits to receive a 04 from another client in a step 322. If a 04 is not received, the process control is returned to step 318 until they are out of client tries.

If a 02 is received in a step 316 or a 04 is received in a step 322, then the client is in communication with the server or a client, respectively. In either instance, a step 324 stores the "link," i.e. the path to a server, whether it is direct to the server or through one or more intermediate clients. Next, in a step 326, a 05 is sent to the link, and a step 328 determines whether a 06 is returned. If not, the process is terminated as indicated at 320. If a 06 has been received then a 07 is sent to the link in a step 330, and a step 332 determines whether a 08 is returned. If not, a step 334 determines is they are out of tries, and if not, process control is returned to step 330 to send another 07 to the link. If after a certain number of tries, e.g. 3 tries, a 08 is not received in response to 07 transmitted by the client, the process terminates with a failure at a step 320. If a 08 is received as determined by step 332, a random check-in time is set in a step 336. A random check-in time is set so that not all clients will try to check in with the server at the same time. Preferably, the random times will equally distribute the check-in times for the various clients equally within the aforementioned period INTERVAL. Finally, at this point, the client is connected into the network and the transmit/receive process is accomplished in a step 338. Of course, if the client was on the network as determined by step 310, the step 338 can be performed directly. The step 338 will be performed until there is a time-out of the transmit/receive process due to the round-robin scheduling by the client process control 302 (see FIG. 14).

Figure 16:
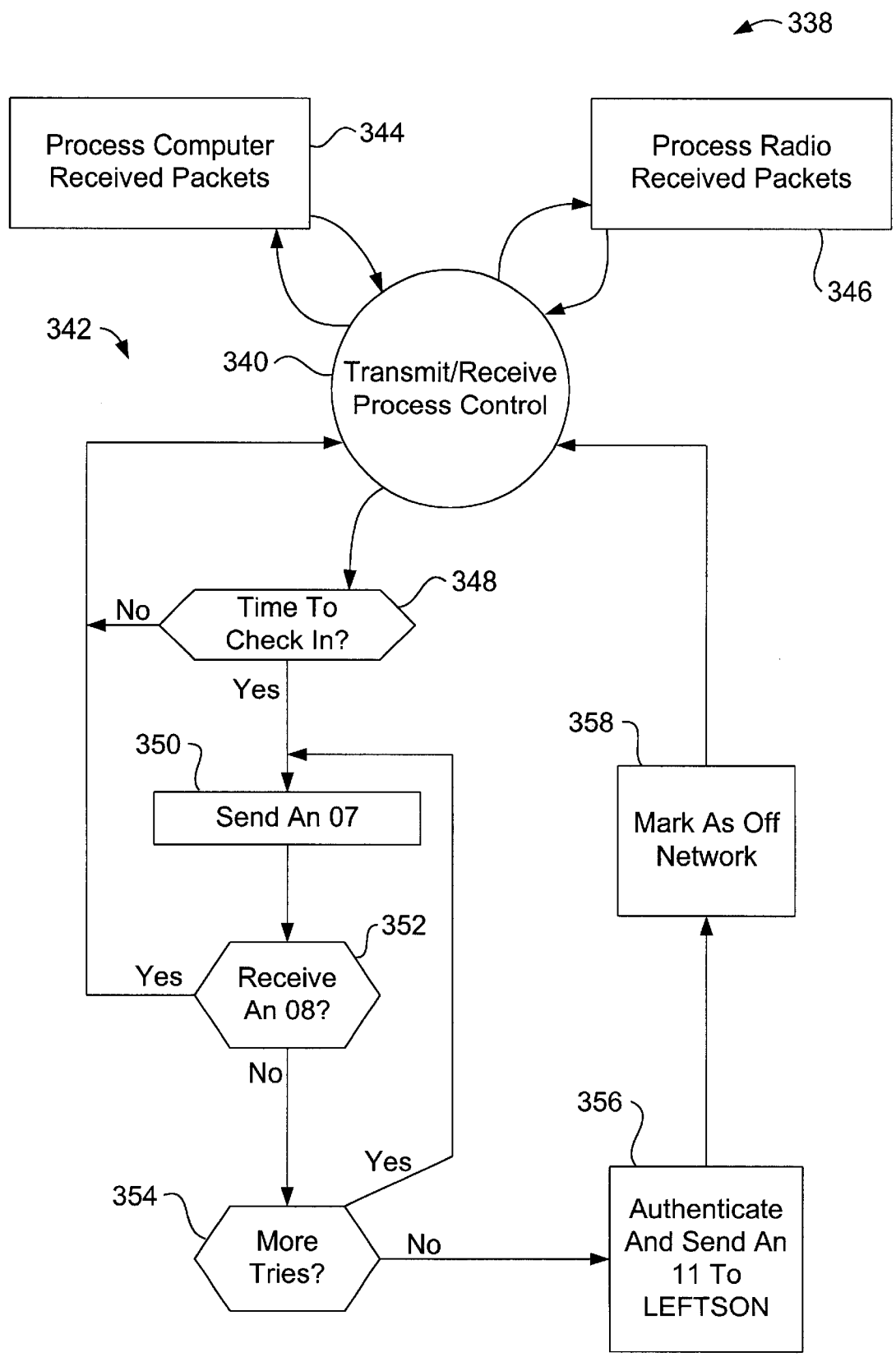
FIG. 16 is a flow diagram of the process "Perform Transmit/Receive Process" of FIG. 15.

In FIG. 16, the process 338 "Perform Transmit/Receive" is illustrated in greater detail. The process 338 has a transmit/receive process control 340 and three subprocesses 342, 344, and 346. Again, time are allocated to the various subprocesses on a round-robin basis.

The subprocess 342 is the check-in routine where the client is required to check in on a periodic basis with the server to avoid being dropped from the server's routing list. As noted previously, the check-in start time is essentially random, and is within a given period INTERVAL. More particularly, the subprocess 342 begins with a decision 348 as to whether it is the proper time to check-in. If not, process control is immediately returned to process control 340. If it is check-in time, a 07 is sent to the server. If a 08 is received from the server, all is well and process control is returned to process control 340. If the expected 08 is not received, decision step 354 determines if there are any more tries. Typically, at least three tries will be allowed. If there are more tries, process control is returned to step 350. If there aren't any more tries, a step 356 will authenticate and send an 11 to the left son of the client that the client is removing itself from the network. Authentication prevents the situation where a "promiscuous" spooler could masquerade as a client and transmit an "11" packet with downstream client addresses, thereby disconnecting those downstream clients from the network. The client then marks itself as being disconnected or "off" of the network in a step 358, and process control is returned to process control 340.

Figure 17:
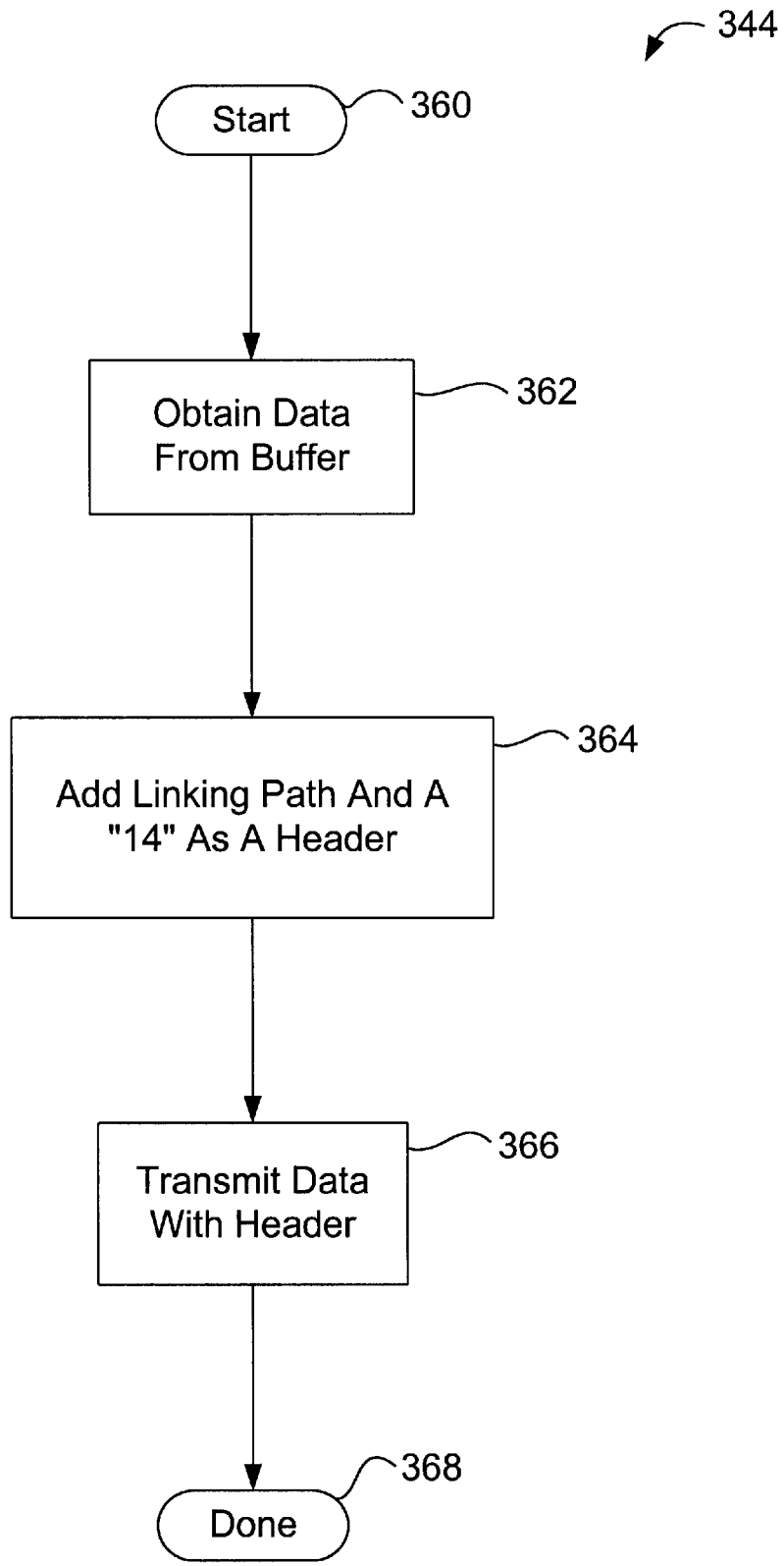
FIG. 17 is a flow diagram of the process "Process Computer Receive Packets" of FIG. 16.

In FIG. 17, the process 344 "Process Computer Received Packets" is shown in flow diagram form. The process 344 begins at 360 and, in a step 362, the data is obtained from a buffer. Next, in a step 364, the header is added to the data, including the link and the packet type "14" to indicate that this is a data-type data packet. Next, the data packet, complete with header, is transmitted. The process is completed at 368.

Figure 18:
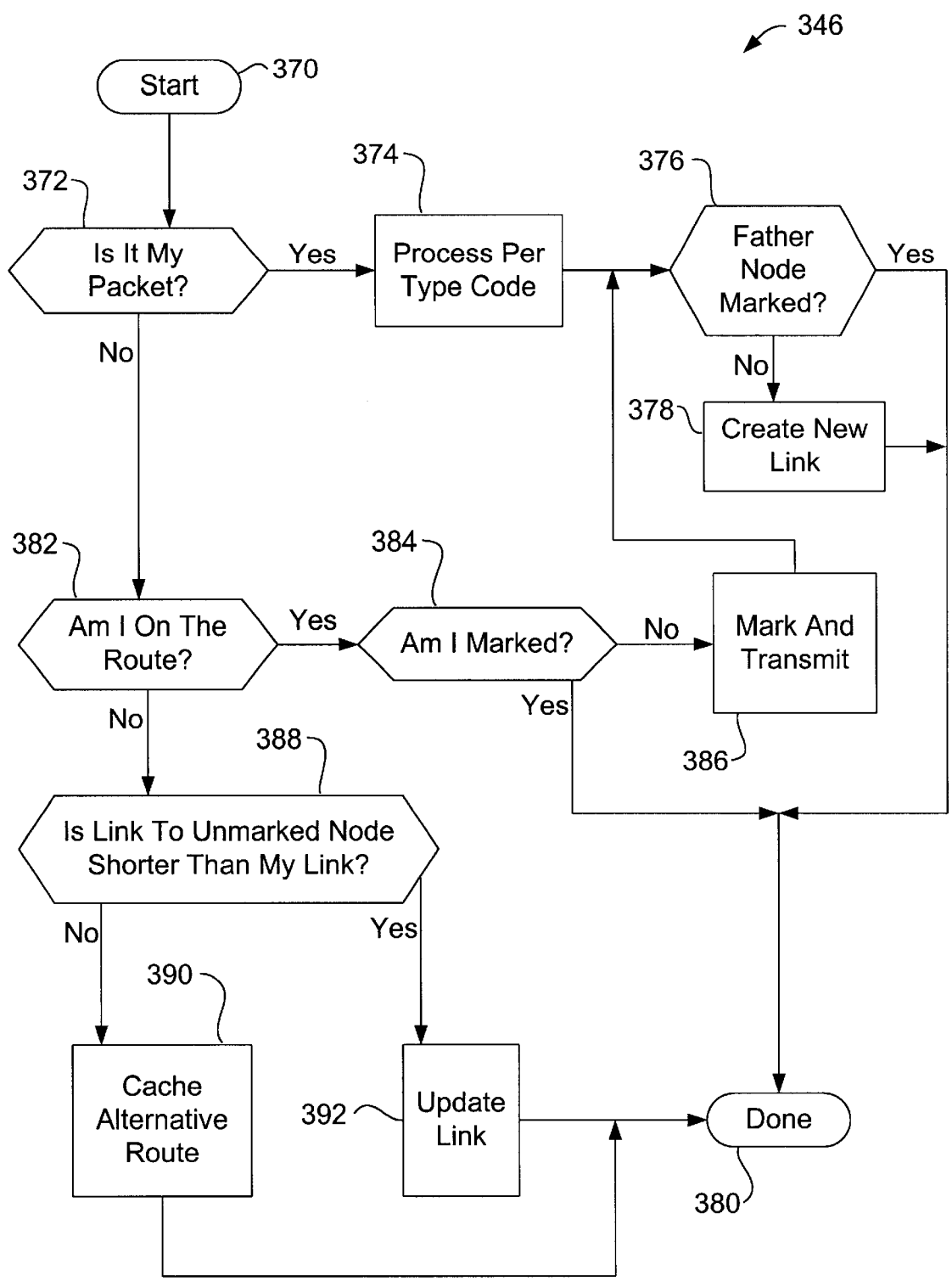
FIG. 18 is a flow diagram of the process "Process Radio Received Packets" of FIG. 16.

FIG. 18 illustrates the process 346 "Process Radio Received Packets" of FIG. 16 in greater detail. The process 346 begins at 370 and, in a step 373, determines if the received packet is for it. If yes, a step 374 will process the packet per the code type, as will be discussed in greater detail subsequently. Then, a step 376 determines if the father node of the client has been marked. Not, a new, shorter link is created since the packet was received without being relayed by the father node. If the father node has been marked, or after a new link has been created, the process terminates at 380.

If step 372 determines that it is not that client's packet, a step 382 determines if that client is on the route for the packet. If yes, a step 384 tests to see if the client is marked. If it is marked, it has already sent that packet and the process is completed at 380. If the client hasn't been marked, it marks itself in the header of the data packet and transmits the packet in a step 386. Process control is then given to step 376 to see if the client's link can be upgraded as discussed previously.

If step 382 determines that the packet is not for that client, and that the client is not part of the link, steps 388–392 still analyze the packet in a process known as "pooning." Since this client can hear this packet, there is an opportunity to upgrade its link. Step 388 determines whether the link to the last marked node plus one (i.e. the distance to the first unmarked node) is shorter than its own link. This is because this client is listening to the last marked node, and the number of hops through that last marked node is the number of hops of that last marked node plus one. If it is, the client's link is updated in a step 392 to this shorter link. If not, the alternative route is cached in case the client's current link becomes inoperative. Therefore, in the pooning process, the client listens to all packets to continuously and dynamically update its link to the best possible path.

Figure 18A:
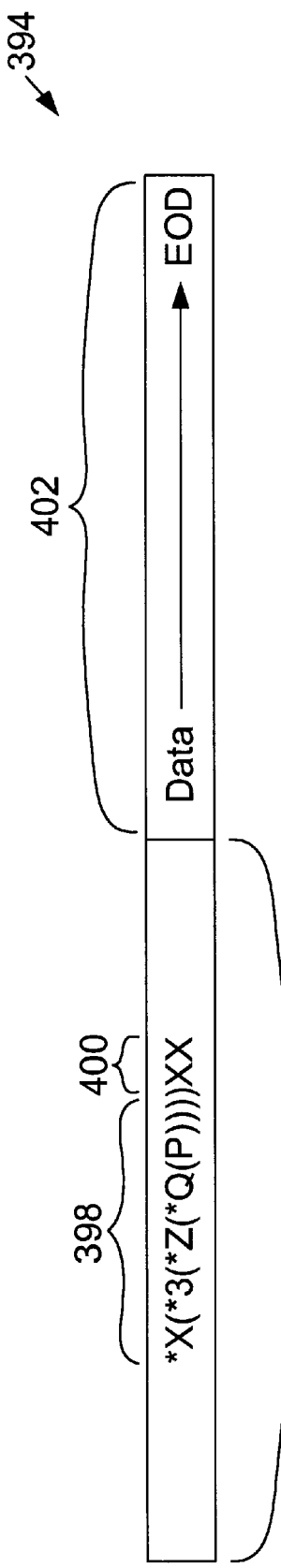
FIGS. 18A and 18B are used to illustrate the process "Is It My Packet?" of FIG. 18.
Figure 18B:
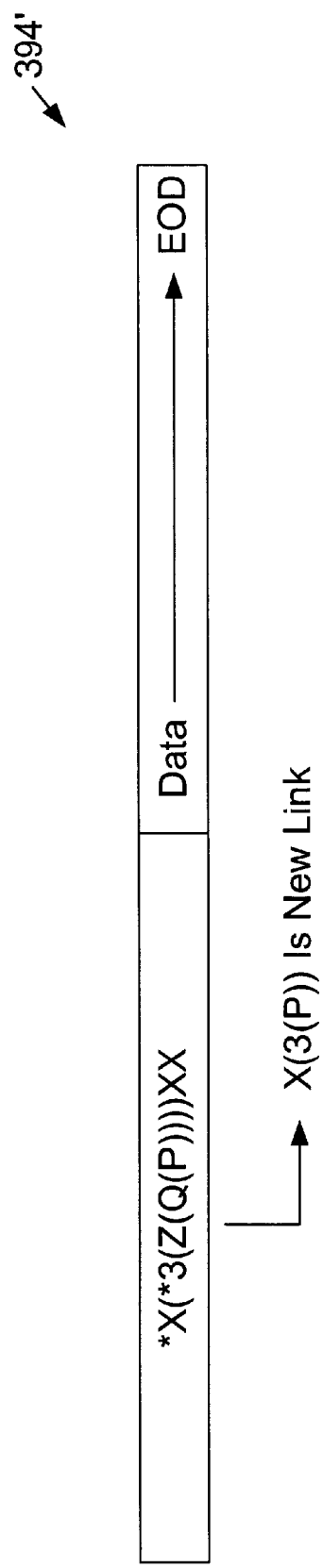

In FIG. 18A, a data packet 394 of the present invention includes a header portion 396 including a link section 398 and a data type section 400, and a data portion 402. The link 398 indicates that the destination of this data packet is the node P. The two digit data type 400 indicates what type of data is being sent, and the data field 402 includes the actual data and is terminated within EOD (end of data) marker. This packet corresponds to the tree of FIG. 9a. Since all upstream nodes (i.e. nodes Q, Z, 3, and X) are marked with asterisks ("*"), it is known that the data packet has passed through and has been marked by each of these nodes before reaching the node P. If, however, the data packet 394' of FIG. 18B is received where in only nodes X and 3 are marked, this means that the node 3 can hear the transmission of node (client) 3 directly. In this instance, there is no need to go through nodes Q and Z to reach the server X. As a result, the new, upgraded link is from node P to node 3 to the server X. This is represented by the notation: X(3((P)).

Figure 19:
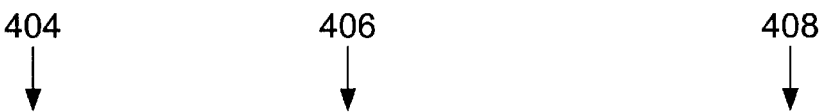
FIG. 19 is used to illustrate the "Process Per Type Code" of FIG. 18.

The table of FIG. 19 is used to illustrate the "Process Per Type Code" step 384 of FIG. 18. The table of FIG. 19 includes three columns 404, 406, and 408. The first column 404, lists the codes that can be received. These codes corresponds to the 2 byte code 400 of the data packet 394 of FIG. 18A. The second column 406 corresponds to the server responses to receiving such codes, and the third column 408 are the client responses to receiving the codes. We will now discuss each of the codes, in sequence.

When the server receives a 01 code, its response is a 02 code plus a one-way seed as discussed previously. Since a 01 code is never intended for a client, it will ignore or "drop" the 01 coded data packets.

For the 02, 03, and 04 codes, the server will ignore or drop those data packets because these data packets are only intended for clients. If a client receives a 02, it responds with a 05 and a one-way response. In response to a 03, a client will send a 04 and a seed or a null. In response to a 04, the client will send a 05 and a one-way seed. Again, one-way seeds and responses to one-way seeds were discussed previously.

When a server receives a 05, if it has previously sent a 02 and if the 05 is authentic, then it will send a 06. Otherwise, it will drop the packet. When a client receives a 05, if it had previously sent a 04, and if the 05 is authentic, then it sends a 06. Otherwise, the client will drop the data packet. If the server receives a 06, it will drop the data packet. If a client receives a 06 after it sent a 05, then it will send a 07. Otherwise, it will drop the packet as well.

When a 07 is received from the server, it will immediately respond with a 08. Since 07 coded packets are never intended for clients, it will be dropped.

Data packets coded with an 08, 09, 10, or 11 are all dropped if received by a server. If a client receives a 08, it will update the tree or repeat the data. In response to a 09, a client will send a 10. In response to a 10, a client will update the tree or repeat the data. In response to a type 11, it send an 11 to the left son with the address the departing node plus a 01 to reconnect to the network.

Data packets of type 12 and 86 are currently reserved. In response to a data packet type 13, a server will delete the sender. Since this is a server destination data packet only, if a client receives a data packet of type 13, it will drop the data packet.

Finally, if a server receives a data packet of type 14, it will send it to the network transmit buffer. If a client receives a data packet of type 14, it will send it to the computer transmit buffer.

Figure 20:
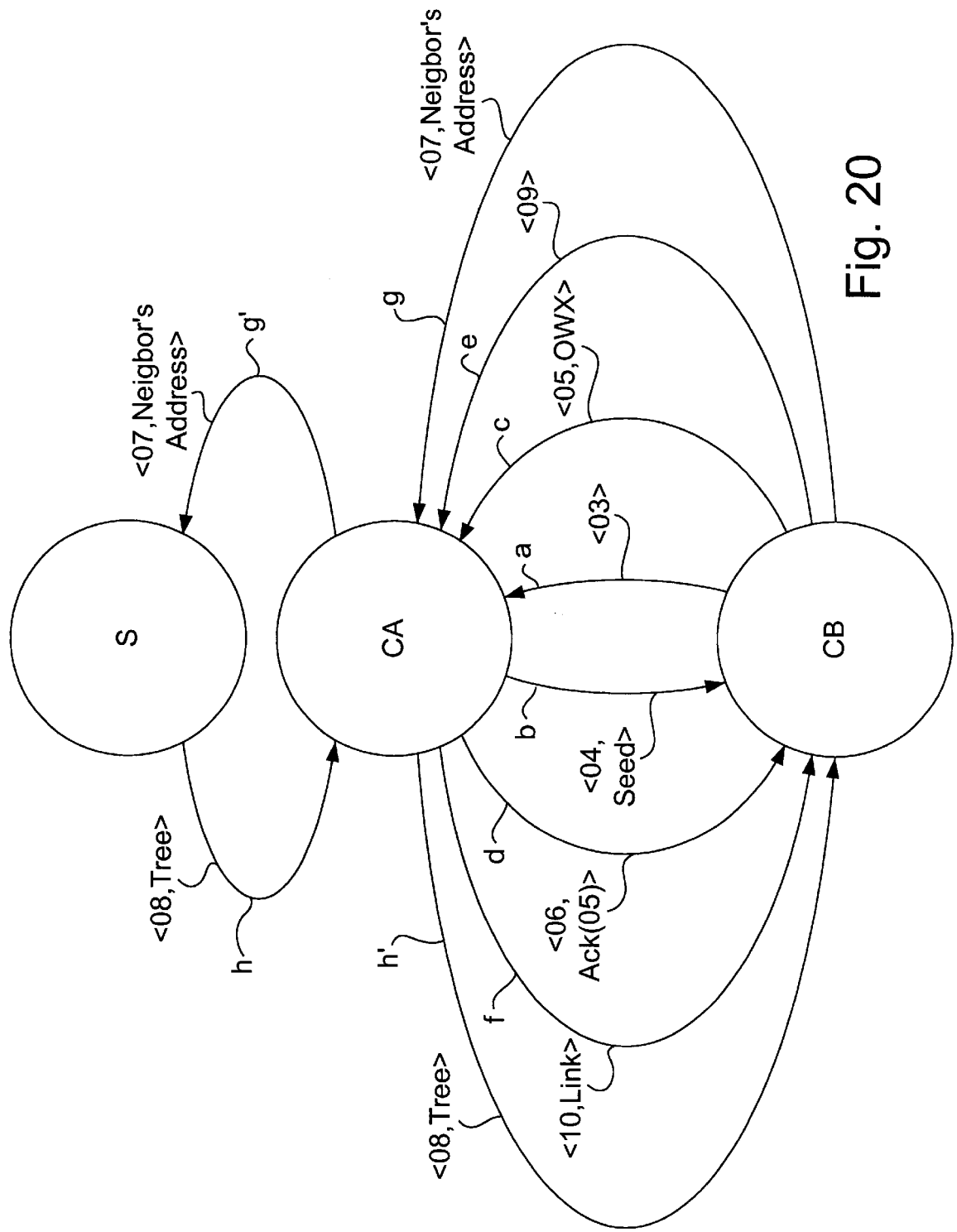
FIG. 20 illustrates an initialization routine of the client process of the present invention.

FIG. 20 illustrates an initialization routine which connects a client CB to a server S through another client CA. The sequence is as follows. As indicated by arrow a, client CB sends a 03 to client CA. In return, the client CA sends a 04 and a seed back to client CB as indicated by arrow b. Client CB then sends a 05 and a one-way response as indicated by arrow c to client CA, and client CA sends a 06 and an acknowledgment with a 05 to client CD as indicated by arrow d. Then, client CB sends a 09 to client CA as indicated by arrow e, and client CA sends a 10 and the link to the client CB as indicated by arrow f. Client CB then sends a 07 and the neighbor's addresses to the client CA as indicated by arrow g, and a client CA relays the 07 and the neighbor's address to the server S as indicated by arrow g'. The server S then sends a 08 and the tree to the client CA as indicated by arrow h, and the client CA relays the 08 and the tree to the client CB as indicated by the arrow h'. At this point, the client CB has the link to the server S and the complete tree of the network in its memory.

Figure 21B:
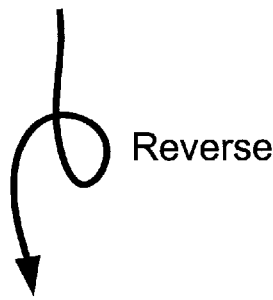
Figure 21D:
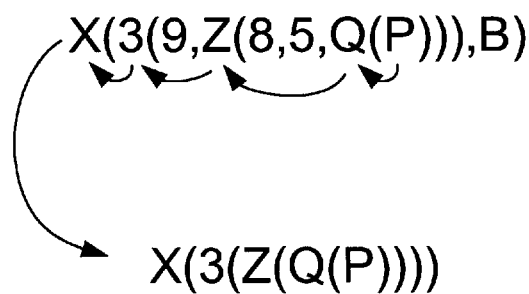

FIGS. 21a–21d illustrate a portion of the server process which deals with determining a return path from a received data packet at a server. Assume, for example, the tree is known to the server is as illustrated in FIG. 21a. This is the same tree as was illustrated in an example of FIGS. 9a and 9b. Then, assume that the server X receives the packet from a client P as illustrated in FIG. 21b. The simplest way of determining the reverse address is simply reverse the link section of the header portion of the data packet of FIG. 21b to provide a return address of 21c. However, if the part of the address of the header of the data packet of FIG. 21b has been lost or corrupted during the transition process, the tree of FIG. 21a can be used to reconstruct the return path. This is accomplished by jumping from parent to parent in reverse order as indicated to determine the return path. In this example, the reverse order parent jumping indicates that the original path the server X was P>Q>Z>3>X, which, when reversed, gives us the proper reverse path, namely X(3(Z(Q(P)))). As will be appreciated by those skilled in the art, this type of reverse tree traversal is easily accomplished with a recursive function.

While this invention has been described in terms of several preferred embodiments, there are alterations, permutations, and equivalents which fall within the scope of this invention. It should also be noted that there are may alternative ways of implementing both the process and apparatus or the present invention. It is therefore intended that the following appended claims be interpreted as including all such alterations, permutations, and equivalents as fall within the true spirit and scope of the present invention.

What is claimed is:

1. A server providing a gateway between two networks, where at least one of the two networks is a wireless network, said server comprising:

a radio modem capable of communicating with a first network that operates, at least in part, by wireless communication;

a network interface capable of communicating with a second network; and a digital controller coupled to said radio modem and to said network interface, said digital controller communicating with said first network via said radio modem and communicating with said second network via said network interface, said digital controller passing data packets received from said first network that are destined for said second network to said second network, and passing data packets received from said second network that are destined for said first network to said first network, said digital controller maintaining a map of data packet transmission paths of a plurality of clients of said first network, where a transmission path of a client of said first network to said server can be through one or more of other clients of said first network;

wherein said digital controller changes the transmission paths of clients to optimize the transmission paths including changing the transmission path from the client to the gateway so that the path to the gateway is chosen from the group consisting essentially of the path to the gateway through the least possible number of additional clients, the path to the gateway through the most robust additional clients, the path to the gateway through the clients with the least amount of traffic, and the path to the gateway through the fastest clients.

2. A server as recited in claim 1, wherein the second network is a TCP/IP protocol network.

3. A server as recited in claim 1, wherein the network interface is a router.

4. A server as recited in claim 1, wherein the digital controller translates data packets received from the second network and destined for the first network into a format used by the first network, and the digital controller translates data packets received from the first network and destined for the second network into a format used by the second network.

5. A server as recited in claim 2:

wherein the digital controller receives data packets from the TCP/IP protocol network destined for a client of the first network, adds a header that includes an address of the client of the first network and a data transmission path to the client of the first network, adds a indicator of the type of data associated with the packet, and transmits the packet via the radio modem with the header and the indicator; and wherein the digital controller receives data packets from the first network destined for the TCP/IP protocol network, converts the data packets into TCP/IP format, and sends the TCP/IP format data packet to an IP address on the TCP/IP protocol network.

6. A server providing a gateway between a wireless network and a second network comprising:

means for receiving a data packet from a client of said wireless network, means for converting said data packet to a format used in said second network, and means for sending said data packet to a proper location on said second network; and means for receiving a data packet from said second network, means for converting said data packet to a format used in said wireless network, and means for transmitting said data packet with said header to a client of said wireless network; and means for changing the transmission paths of clients to optimize the transmission paths includes changing the transmission path from the client to the gateway so that the path to the gateway is chosen from the group consisting essentially of the path to the gateway through the least possible number of additional clients, the path to the gateway through the most robust additional clients, the path to the gateway through the clients with the least amount of traffic, and the path to the gateway through the fastest clients.

7. A server as recited in claim 6:

wherein the second network is a TCP/IP protocol network;

wherein the means for converting the data packet to a format used in a second network is a means for converting the data packet to a TCP/IP format if it is destined for an IP address on a TCP/IP protocol network;

wherein the means for sending the data packet to a proper location on the second network is a means for sending the TCP/IP format data packet to the IP address on the TCP/IP protocol network; and wherein the means for receiving a data packet from the second network is a means for receiving a data packet from the TCP/IP protocol network.

8. A server as recited in claim 6, wherein the means for converting the data packet to a format used in the wireless network includes means for adding a header to the packet including a reverse link and a data packet type if the data packet is destined for a client of the wireless network, the reverse link being one of a direct link to the client and an indirect link to the client through one or more other clients of the wireless network, and means for transmitting the data packet with the header to a client of the wireless network.

9. A server as recited in claim 7, wherein the means for converting the data packet to a format used in the wireless network includes means for adding a header to the packet including a reverse link and a data packet type if the data packet is destined for a client of the wireless network, the reverse link being one of a direct link to the client and an indirect link to the client through one or more other clients of the wireless network, and means for transmitting the data packet with the header to a client of the wireless network.

10. A method providing a gateway between a wireless network and a second network comprising:

receiving a data packet from a client of said wireless network, converting said data packet to a proper format for said second network, and sending said data packet to said second network; and receiving a data packet from said second network, adding a header to said packet including a reverse link and a data packet type if said data packet is destined for a client of said wireless network, said reverse link being one of a direct link to said client and an indirect link to said client through one or more other clients of said network, and transmitting said data packet with said header; and changing the transmission paths of clients to optimize the transmission paths including changing the transmission path from the client to the gateway so that the path to the gateway is chosen from the group consisting essentially of the path to the gateway through the least possible number of additional clients, the path to the gateway through the most robust additional clients, the path to the gateway through the clients with the least amount of traffic, and the path to the gateway through the fastest clients.

11. A method as recited in claim 10:

wherein the second network is a TCP/IP protocol network;

wherein the data packet received from a client of a wireless network is converted to a TCP/IP format if it is destined for an IP address on a TCP/IP protocol network, and the TCP/IP format data packet is sent to the IP address on the TCP/IP protocol network; and wherein the data packet received from the second network is received from the TCP/IP protocol network.

12. A method as recited in claim 10 wherein converting the data packet to a proper format for the second network includes removing the header from the packet, including the reverse link and data packet type.

13. A method as recited in claim 10 further comprising maintaining a map of data packet transmission paths of a plurality of clients of the wireless network, where a transmission path of a client of the wireless network to the server can be through one or more other clients of the first network.

14. A method as recited in claim 13, further comprising dynamically updating the map of data packet transmission paths to optimize the data packet transmission paths of the clients.

15. A gateway between at least two networks, where at least one of the two networks is a wireless network, the gateway comprising:

a first interface capable of communicating with a first network that operates, at least in part, by wireless communication, and includes at least one client;

a second interface capable of communicating with a second network; and a digital controller coupled to the first interface and the second interface, the digital controller capable of communicating with the first network via the first interface and communicating with the second network via the second interface, the digital controller maintaining a map of transmission paths of the first network, where the transmission path of a client to the gateway can be directly from the client to the gateway or indirectly to the gateway through one or more of other clients of the first network, the digital controller sending the map of transmission paths to any client that requests the map, the digital controller dynamically updating the map of transmission paths, adding and removing clients and changing the transmission paths of clients to optimize the transmission paths;

wherein said digital controller changes the transmission paths of clients to optimize the transmission paths including changing the transmission path from the client to the gateway so that the path to the gateway is chosen from the group consisting essentially of the path to the gateway through the least possible number of additional clients, the path to the gateway through the most robust additional clients, the path to the gateway through the clients with the least amount of traffic, and the path to the gateway through the fastest clients.

16. The gateway of claim 15:

wherein when the gateway receives information from the first network that is destined for the second network, the gateway translates the information received from the first network into a format used in the second network if necessary, and sends the information from the first network destined for the second network to the second network; and wherein when the gateway receives information from the second network that is destined for the first network, the gateway translates the information received from the second network into a format used in the first network if necessary, and sends the information from the second network destined for the first network to the first network.

17. The gateway of claim 16, wherein translating the information received from the second network into a format used in the first network includes adding a header that includes an address of a destination client of the first network and the transmission path to the destination client of the first network.

18. The gateway of claim 16, wherein the second network is a TCP/IP protocol network, and the information received from the first network, the information sent to the first network, the information sent to the second network, and the information received from the second network are in the form of data packets.

19. The gateway of claim 15, wherein changing the transmission paths of clients to optimize the transmission paths includes adding a new client of the first network to the map as the new client becomes active, removing a client of the first network from the map if the client becomes inactive.

* * * * *

UNITED STATES PATENT AND TRADEMARK OFFICE
CERTIFICATE OF CORRECTION

| | | |
|---|---|---|
| PATENT NO. | : 6,249,516 B1 | Page 1 of 1 |
| DATED | : June 19, 2001 | |
| INVENTOR(S) | : Edwin B. Brownrigg and Thomas W. Wilson | |

It is certified that error appears in the above-identified patent and that said Letters Patent is hereby corrected as shown below:

<u>Column 24,</u>
Line 21, replace "said" with -- a --.

Signed and Sealed this

Sixteenth Day of May, 2006

JON W. DUDAS
*Director of the United States Patent and Trademark Office*

US006249516C1

(12) EX PARTE REEXAMINATION CERTIFICATE (6526th)
United States Patent
Brownrigg et al.

(10) Number: US 6,249,516 C1
(45) Certificate Issued: Nov. 18, 2008

(54) WIRELESS NETWORK GATEWAY AND METHOD FOR PROVIDING SAME

(75) Inventors: Edwin B. Brownrigg, Roseville, CA (US); Thomas W. Wilson, Alameda, CA (US)

(73) Assignee: IPCO, LLC, Atlanta, GA (US)

Reexamination Request:
No. 90/008,005, Apr. 12, 2006

Reexamination Certificate for:
Patent No.: 6,249,516
Issued: Jun. 19, 2001
Appl. No.: 09/492,930
Filed: Jan. 27, 2000

Certificate of Correction issued May 16, 2006.

Related U.S. Application Data

(62) Division of application No. 08/760,895, filed on Dec. 6, 1996, now Pat. No. 6,044,062.

(51) Int. Cl.
*H04L 29/06* (2006.01)
*H04Q 7/22* (2006.01)

(52) U.S. Cl. .................................. 370/338; 370/401
(58) Field of Classification Search .................. None
See application file for complete search history.

(56) References Cited

U.S. PATENT DOCUMENTS

| | | | |
|---|---|---|---|
| 4,278,975 A | 7/1981 | Kimura et al. |
| 4,788,721 A | 11/1988 | Krishnan et al. |
| 4,939,726 A | 7/1990 | Flammer et al. |
| 5,007,052 A | 4/1991 | Flammer |
| 5,079,768 A | 1/1992 | Flammer |
| 5,115,433 A | 5/1992 | Baran et al. |
| 5,130,987 A | 7/1992 | Flammer |
| 5,265,150 A | 11/1993 | Helmkamp et al. |
| 5,295,154 A | 3/1994 | Meier et al. |
| 5,309,501 A | 5/1994 | Kozik et al. |
| 5,323,384 A | 6/1994 | Norwood et al. |

(Continued)

FOREIGN PATENT DOCUMENTS

| WO | WO 95/34177 | 12/1995 |

OTHER PUBLICATIONS

Johnson, David B.; Routing in Ad Hoc Networks of Mobile Hosts; IEEE (1995); pp. 158–163.

(Continued)

*Primary Examiner*—Charles Craver

(57) ABSTRACT

A wireless network system includes a server having a server controller and a server radio modem, and a number of clients each including a client controller and a client radio modem. The server controller implements a server process that includes the receipt and the transmission of data packets via the radio modem. The client controllers of each of the clients implements a client process that includes the receipt and transmission of data packets via the client radio modem. The client process of each of the clients initiates, selects, and maintains a radio transmission path to the server that is either a direct path to the server, or is an indirect path or "link" to the server through at least one of the remainder of the clients. A method for providing wireless network communication includes providing a server implementing a server process including receiving data packets via a radio modem, sending data packets via the server radio modem, communicating with the network, and performing housekeeping functions, and further includes providing a number of clients, each implementing a client process sending and receiving data packets via a client radio modem, maintaining a send/receive data buffer, and selecting a radio transmission path to the server. The radio transmission path or "link" is either a direct path to the server, or an indirect path to the server through at least one of the remainder of the clients. The process preferably optimizes the link to minimize the number of "hops" to the server.

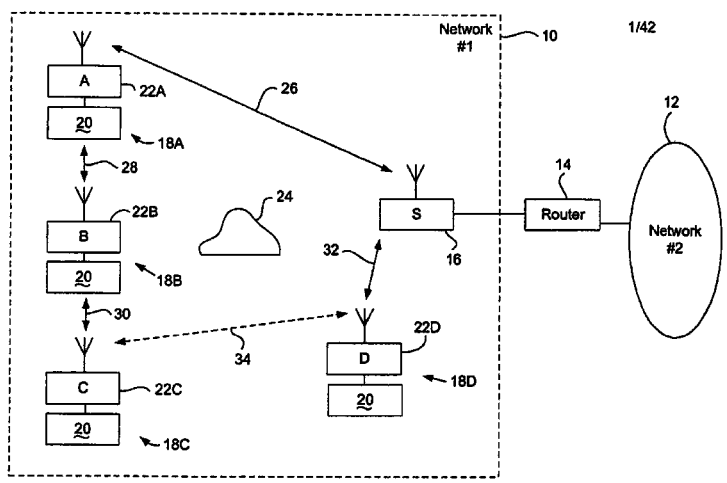

U.S. PATENT DOCUMENTS

| | | | |
|---|---|---|---|
| 5,329,394 | A | 7/1994 | Calvani et al. |
| 5,335,265 | A | 8/1994 | Cooper et al. |
| 5,345,595 | A | 9/1994 | Johnson et al. |
| 5,355,278 | A | 10/1994 | Hosoi et al. |
| 5,420,910 | A | 5/1995 | Rudokas et al. |
| 5,467,345 | A | 11/1995 | Cutler, Jr. et al. |
| 5,488,608 | A | 1/1996 | Flammer, III |
| 5,570,084 | A | 10/1996 | Ritter et al. |
| 5,596,719 | A | 1/1997 | Ramakrishnan et al. |
| 5,636,216 | A | 6/1997 | Fox et al. |
| 5,708,655 | A | 1/1998 | Toth et al. |
| 5,748,619 | A | 5/1998 | Meier et al. |
| 5,825,772 | A | 10/1998 | Dobbins et al. |
| 5,907,540 | A | 5/1999 | Hayashi |
| 5,953,319 | A | 9/1999 | Dutta et al. |
| 5,960,074 | A | 9/1999 | Clark |
| 5,974,236 | A | 10/1999 | Sherman |
| 5,978,364 | A | 11/1999 | Melnik |
| 6,304,556 | B1 | 10/2001 | Haas |
| 6,421,731 | B1 | 7/2002 | Ciotti, Jr. et al. |
| 7,054,271 | B2 | 5/2006 | Brownrigg et al. |
| 2006/0095876 | A1 | 5/2006 | Brownrigg et al. |
| 2006/0098576 | A1 | 5/2006 | Brownrigg et al. |

OTHER PUBLICATIONS

Office Action dated Oct. 11, 2007, in co–pending U.S. Appl. No. 11/300,902, filed Dec. 15, 2005.

Kleinrock, Leonard and Kamoun, Farouk, "*Hierarchical Routing for Large Networks*," North–Holland Publishing Company, Computer Networks 1, 1997, pp. 155–174.

Browrigg, E.B. et al.; A Packet Radio Network for Library Automation; IEEE (1987); pp. 456–462.

Brownrigg, E.B. et al.; Packet Radio Networks; Architectures, Protocols, Technologies and Applications (1987), (introduction pp. ix–xviii); pp. 3–274.

Brownrigg, E.B. et al.; Distribution, Networks, and Networking: Options for Dissemination; Workshop on Electronic Texts Session III (http://palimpsest.standford.edu/byorg/lc/etextw/sess3.html 1992); pp. 1–10.

Brownrigg, E.B.; User Provided Access to the Internet; (http://web.simmons.edu/~chen/nit/NIT'92/033–bro.htm 2005); pp. 1–6.

Wey, J.; Clone Terminator: An Authentication Service for Advanced Mobile Phone System; IEEE (1995); pp. 175–179.

Davis, A.B. et al.; Knowledge–Based Management of Cellular Clone Fraud; IEEE (1992); pp. 230–234.

U.S. Appl. No. 09/492,933, filed Jan. 27, 2000, now abandoned.

Office Action dated Sep. 10, 2002, in U.S. Appl. No. 09/492,933.

U.S. Appl. No. 10/386,159, which corresponds to U.S. Pat. No. 7,054,271, filed Mar. 10, 2003.

Office Action dated Jan. 11, 2005, in U.S. Appl. No. 10/386,159.

Amendment and Remarks dated Jul. 7, 2005, in U.S. Appl. No. 30/386,159.

Notice of Allowability containing Examiner's Amendment dated Jul. 27, 2005, in U.S. Appl. No. 10/386,159.

Request for Ex parte Reexamination Under 37 C.F.R. §1.510 dated Apr. 17, 2006, in co–pending Re–Exam Control No. 90/008,011.

Order Granting/Denying Request for Ex Parte Reexamination dated Aug. 3, 2006, in co–pending Re–Exam Control No. 90/008,011.

Pleading, Cellnet Technology, Inc.'s LPR 4.2 Response dated Feb. 22, 2006.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–5 and 15–19 is confirmed.

Claims 6 and 10 are determined to be patentable as amended.

Claims 7–9 and 11–14, dependent on an amended claim, are determined to be patentable.

6. A server providing a gateway between a wireless network and a second network comprising:
   means for receiving a data packet from a client of said wireless network, means for converting said data packet to a format used in said second network, and means for sending said data packet to a proper location on said second network; and
   means for receiving a data packet from said second network, means for converting said data packet to a format used in said wireless network, and means for transmitting said data packet with said header to a client of said wireless network; and
   means for changing [the] transmission paths of clients to optimize the transmission paths [includes] *including* changing the transmission path from the client to the gateway so that the path to the gateway is chosen from the group consisting essentially of the path to the gateway through the least possible number of additional clients, the path to the gateway through the most robust additional clients, the path to the gateway through the clients with the least amount of traffic, and the path to the gateway through the fastest clients.

10. A method providing a gateway between a wireless network and a second network comprising:
    receiving a data packet from a client of said wireless network, converting said data packet to a proper format for said second network, and sending said data packet to said second network; and
    receiving a data packet from said second network, adding a header to said packet including a reverse link and a data packet type if said data packet is destined for a client of said wireless network, said reverse link being one of a direct link to said client and an indirect link to said client through one or more other clients of said network, and transmitting said data packet with said header; and
    changing [the] transmission paths of clients to optimize the transmission paths *including* changing the transmission path from the client to the gateway so that the path to the gateway is chosen from the group consisting essentially of the path to the gateway through the least possible number of additional clients, the path to the gateway through the most robust additional clients, the path to the gateway through the clients with the least amount of traffic, and the path to the gateway through the fastest clients.

\* \* \* \* \*